(12) United States Patent
Handa et al.

(10) Patent No.: US 12,045,356 B2
(45) Date of Patent: Jul. 23, 2024

(54) TERMINAL DEVICE, SERVER, VIRTUAL REALITY SPACE PROVIDING SYSTEM, PROGRAM, AND VIRTUAL REALITY SPACE PROVIDING METHOD

(71) Applicant: Cluster, Inc., Tokyo (JP)

(72) Inventors: Daiki Handa, Tokyo (JP); Shoma Sato, Tokyo (JP); Hiroyuki Tomine, Tokyo (JP)

(73) Assignee: CLUSTER, INC., Tokyo (JP)

( * ) Notice: Subject to any disclaimer, the term of this patent is extended or adjusted under 35 U.S.C. 154(b) by 0 days.

(21) Appl. No.: 17/994,546

(22) Filed: Nov. 28, 2022

(65) Prior Publication Data

US 2023/0169192 A1    Jun. 1, 2023

(30) Foreign Application Priority Data

Nov. 29, 2021 (JP) ................. 2021-193061

(51) Int. Cl.
*G06F 21/60* (2013.01)

(52) U.S. Cl.
CPC .................. *G06F 21/604* (2013.01)

(58) Field of Classification Search
CPC .... A63F 13/58; A63F 13/795; A63F 13/5372; A63F 13/798; A63F 2300/558;
(Continued)

(56) References Cited

U.S. PATENT DOCUMENTS 8,397,168 B2 * 3/2013 Leacock ............. H04L 12/1827 715/764
9,446,303 B2 * 9/2016 Shikata ................. A63F 13/00
(Continued)

FOREIGN PATENT DOCUMENTS

EP 2045748 A1 * 4/2009 ............ G06F 21/14
JP 11-250278 A 9/1999
(Continued)

OTHER PUBLICATIONS

Hogue, Andrew, Sunbir Gill, and Michael Jenkin. "Automated avatar creation for 3D games." Proceedings of the 2007 conference on Future Play. 2007. (Year: 2007).*

(Continued)

*Primary Examiner* — Theodore C Parsons
*Assistant Examiner* — Sameera Wickramasuriya
(74) *Attorney, Agent, or Firm* — XSENSUS LLP

(57) ABSTRACT

A participant terminal includes a virtual reality space information acquisition unit that acquires virtual reality space information, a restricted area information acquisition unit that acquires restricted area information indicating a restricted area, an operation information acquisition unit, an entry state determination result acquisition unit that acquires an entry state determination result, an entry possibility determination result acquisition unit that acquires an entry possibility determination result in a case where the entry state determination result indicates that the avatar is in a state about to enter the restricted area, and a restricted area viewing control unit that enables viewing of the virtual reality space information in the restricted area in a case where the entry possibility determination result indicates that entry is possible, and disables viewing of the virtual reality space information in the restricted area in a case where the entry possibility determination result indicates that entry is not possible.

22 Claims, 10 Drawing Sheets

(58) Field of Classification Search
CPC . A63F 13/5375; A63F 2300/556; G09G 5/00; G06F 21/604
See application file for complete search history.

(56) References Cited

U.S. PATENT DOCUMENTS

| | | | | |
|---|---|---|---|---|
| 11,212,569 | B2* | 12/2021 | Kawakami | H04N 21/2187 |
| 2002/0080173 | A1* | 6/2002 | Tagami | A63F 13/79 |
| | | | | 715/753 |
| 2003/0149731 | A1* | 8/2003 | Ohwa | H04L 12/1813 |
| | | | | 709/206 |
| 2004/0143852 | A1* | 7/2004 | Meyers | A63F 13/12 |
| | | | | 463/43 |
| 2006/0248161 | A1* | 11/2006 | O'Brien | H04L 67/131 |
| | | | | 709/217 |
| 2011/0306417 | A1* | 12/2011 | Sheblak | A63F 13/52 |
| | | | | 463/32 |
| 2012/0050325 | A1* | 3/2012 | Joo | A63F 13/428 |
| | | | | 345/633 |
| 2012/0270620 | A1* | 10/2012 | Bhogal | A63F 13/79 |
| | | | | 463/9 |
| 2018/0095637 | A1* | 4/2018 | Valdivia | H04N 7/157 |
| 2018/0164983 | A1* | 6/2018 | Torii | G06F 3/011 |
| 2018/0288391 | A1* | 10/2018 | Lee | G06F 3/011 |
| 2019/0073816 | A1* | 3/2019 | Shuster | A63F 13/50 |
| 2019/0268587 | A1* | 8/2019 | Sato | H04N 13/15 |
| 2020/0005284 | A1* | 1/2020 | Vijayan | H04L 9/3247 |
| 2020/0051336 | A1 | 2/2020 | Ichikawa et al. | |
| 2020/0086218 | A1* | 3/2020 | Nakano | A63F 13/58 |
| 2020/0206623 | A1* | 7/2020 | Nakano | A63F 13/525 |
| 2020/0206639 | A1* | 7/2020 | Nakano | A63F 13/58 |
| 2021/0389144 | A1* | 12/2021 | Kim | G01C 21/362 |
| 2022/0012920 | A1* | 1/2022 | Beith | G06T 11/00 |
| 2022/0168656 | A1* | 6/2022 | Liu | A63F 13/55 |

FOREIGN PATENT DOCUMENTS

| | | |
|---|---|---|
| JP | 2002-140278 A | 5/2002 |
| JP | 2004-248145 A | 9/2004 |
| JP | 2007-115117 A | 5/2007 |
| JP | 2015-181240 A | 10/2015 |
| JP | 2018-85571 A | 5/2018 |
| JP | 2018-114198 A | 7/2018 |
| JP | 2018-181256 A | 11/2018 |
| JP | 2019-128683 A | 8/2019 |
| JP | 6556301 B1 | 8/2019 |
| JP | 2019128683 A * | 8/2019 |
| JP | 2020-103796 A | 7/2020 |
| JP | 6933849 B1 | 9/2021 |
| JP | 6936913 B1 | 9/2021 |
| JP | 2021-197695 A | 12/2021 |
| WO | 2018/092384 A1 | 5/2018 |

OTHER PUBLICATIONS

Gonzalez-Franco, Mar, et al. "The self-avatar follower effect in virtual reality." 2020 IEEE Conference on Virtual Reality and 3D User Interfaces (VR). IEEE, 2020. (Year: 2020).*

Notice of Reasons for Refusal mailed on Feb. 22, 2022, received for JP Application 2021-193061, 19 pages including English Translation.

Notice of Reasons for Refusal mailed on Jul. 5, 2022, received for JP Application 2021-193061, 12 pages including English Translation.

Decision to Grant mailed on Sep. 6, 2022, received for JP Application 2021-193061, 5 pages including English Translation.

* cited by examiner

TERMINAL DEVICE, SERVER, VIRTUAL REALITY SPACE PROVIDING SYSTEM, PROGRAM, AND VIRTUAL REALITY SPACE PROVIDING METHOD

CROSS-REFERENCE TO RELATED APPLICATION

This application claims priority from Japanese Application No. 2021-193061, filed on Nov. 29, 2021, the contents of which are incorporated by reference herein in its entirety.

BACKGROUND

1. Technical Field

The present disclosure relates to a terminal device, a server, a virtual reality space providing system, a program, and a virtual reality space providing method.

2. Description of the Related Art

The virtual reality technology is a technology that allows a person to view a virtual world constructed on a computer as if the virtual world were real. This virtual world is also referred to as a virtual reality space. Viewing of the virtual reality space by a user who uses a service of the virtual reality space may be performed using a virtual character called an avatar to participate in the virtual reality space. Hereinafter, a user who participates in the virtual reality space using the avatar (virtual character) is referred to as a "participant".

Incidentally, depending on an action of a viewer of the virtual reality space such as the participant, the world view possessed by the provider providing the virtual reality space may collapse. Accordingly, JP 6556301 B2 describes, for example, a technique for restricting the action of the viewer to participate in the virtual reality space using the virtual character.

SUMMARY

In a space in the real world, for a part of an area in the space, such as an inside of a particular building, various restrictions may be set so that only authorized persons can enter the area and view the area. Also in the virtual reality space, there is a demand for setting a restriction similar to such a restriction in the real world. For example, in a case where a pay event is held in the virtual reality space, an organizer of the event may want to allow only participants who satisfy specific conditions from among the participants in the virtual reality space to enter the event site so that the event can be viewed. As described above, also in the virtual reality space, if the restriction on viewing by the participant can be set for a part of the area in the same space, the usefulness of the virtual reality space is enhanced.

However, in the conventional technology as described in JP 6556301 B2, there is a problem that, although it is possible to restrict participation itself in the virtual reality space, it is not assumed to restrict viewing of a part of the area in the virtual reality space.

The present disclosure solves the above problem, and an object thereof is to obtain a terminal device, a server, a virtual reality space providing system, a program, and a virtual reality space providing method capable of restricting viewing of a part of the area in a virtual reality space.

A terminal device according to the present disclosure includes a virtual reality space information acquisition unit that acquires virtual reality space information, which is three-dimensional data of a virtual reality space, from a server, a restricted area information acquisition unit that acquires, from the server, restricted area information that is information different from the virtual reality space information and is three-dimensional data of a restricted area that is a space area partially set as an arbitrary three-dimensional shape in the virtual reality space and to which entry of an avatar that participates in the virtual reality space is restricted, an operation information acquisition unit that acquires operation information for operating the avatar, an entry state determination result acquisition unit that acquires an entry state determination result that is a result of determining whether or not the avatar is in a state about to enter the restricted area on a basis of the restricted area information and the operation information, an entry possibility determination result acquisition unit that acquires an entry possibility determination result that is a result of determination regarding whether or not entry of the avatar to the restricted area is possible in a case where the entry state determination result indicates that the avatar is in a state about to enter the restricted area, and a restricted area viewing control unit that enables viewing of the virtual reality space information in the restricted area in a case where the entry possibility determination result indicates that entry is possible, and disables viewing of the virtual reality space information in the restricted area in a case where the entry possibility determination result indicates that entry is not possible.

According to the present disclosure, the participant whose entry to the restricted area partially set in the virtual reality space is determined to be possible is allowed to view the virtual reality space information in the restricted area, and the participant whose entry to the restricted area is determined to be not possible is not allowed to view the virtual reality space information in the restricted area. Thus, the terminal device according to the present disclosure can restrict viewing of a part of an area in the virtual reality space.

DETAILED DESCRIPTION

First Embodiment

Figure 1:
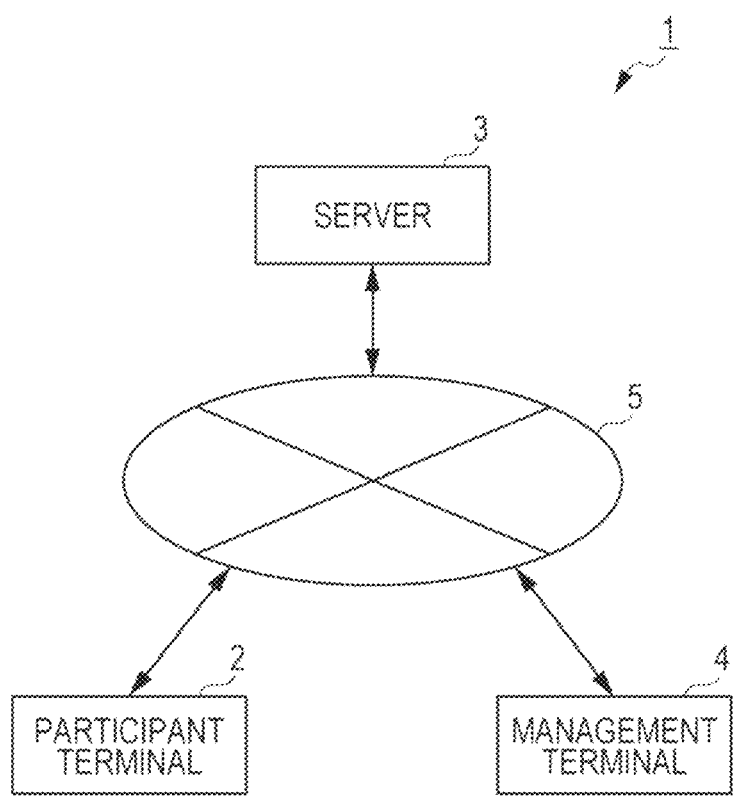
FIG. 1 is a block diagram illustrating a configuration of a virtual reality space providing system according to a first embodiment.

FIG. 1 is a block diagram illustrating a configuration of a virtual reality space providing system 1 according to a first embodiment. In FIG. 1, a virtual reality space providing system 1 is a system in which a participant terminal 2, a server 3, and a management terminal 4 are connected via a network 5. An existing electric communication line can be used as the network 5, and is, for example, the Internet. A virtual reality space is a virtual world constructed on a computer. The virtual reality space providing system 1 is used to provide a service of a virtual reality space. The participant terminal 2 and the management terminal 4 are terminal devices capable of communicating with the server 3 via the network 5.

The participant terminal 2 and the management terminal 4 are, for example, a smartphone, a tablet terminal, or a personal computer (PC). In addition, the participant terminal 2 may be a head mounted display that is used together with a controller and has a communication function. For example, the user wearing the head mounted display on the head and holding the controller in the hand can operate the virtual reality space displayed on the head mounted display by moving the head or the hand or operating a button or the like of the controller. That is, the participant terminal 2 is only required to be a device that displays the virtual reality space and can operate the virtual reality space. Note that, although only one participant terminal 2 and one management terminal 4 are illustrated in FIG. 1, a plurality of the participant terminals 2 and a plurality of the management terminals 4 may exist. The same applies to each modification described later.

The server 3 manages the virtual reality space and provides the service of the virtual reality space via the network 5. More specifically, the server 3 manages virtual reality space information that is three-dimensional data of the virtual reality space. Note that, although only one server 3 is illustrated in FIG. 1, the function of the server 3 to be described later may be implemented by one server or may be implemented by a plurality of servers. The same applies to each modification described later.

The user who uses the service of the virtual reality space can participate in the virtual reality space through the network 5 and view the virtual reality space by using the participant terminal 2. Specifically, participation of the user in the virtual reality space is performed using a virtual character called an avatar to participate in the virtual reality space.

A restricted area is set in the virtual reality space in the first embodiment. The restricted area is a space area partially set in the virtual reality space, and is an area in which the entry of the avatar participating in the virtual reality space is restricted. The restricted area may be set as an area having an arbitrary three-dimensional shape in the virtual reality space. The shape of the restricted area may be a simple shape such as a rectangular parallelepiped shape or a cylindrical shape, or may be a complicated shape such as the same shape as various indoor shapes. The data indicating the restricted area may be defined by, for example, a shape, a size, an orientation, and a position of the restricted area, or may be defined similarly to data indicating a shape of another object or the like in the virtual reality space. The participant terminal 2 enables viewing of the virtual reality space information in the restricted area by the avatar whose entry to the restricted area is determined to be possible. On the other hand, the participant terminal 2 disables viewing of the virtual reality space information in the restricted area by the avatar whose entry to the restricted area is determined to be not possible. Thus, the participant terminal 2 can restrict the viewing of the restricted area in the virtual reality space. A main purpose of the virtual reality space providing system 1 restricting the entry of the avatar to the restricted area is to restrict viewing of the virtual reality space information in the restricted area (hereinafter, the viewing of the virtual reality space information in the restricted area may be simply expressed as "viewing in the restricted area"). Therefore, for the avatar whose entry to the restricted area is determined to be not possible, for example, the virtual reality space providing system 1 according to the first embodiment may prevent the position of the avatar from becoming a position in the restricted area, thereby disabling viewing of the restricted area, or even if the position of the avatar is allowed to become a position in the restricted area, the virtual reality space providing system 1 according to the first embodiment may perform some processing for making the virtual reality space information in the restricted area invisible from the avatar, thereby disabling viewing of the restricted area.

The management terminal 4 is a restricted area setting terminal device for setting the restricted area in the virtual reality space. For example, the management terminal 4 sets restricted area information indicating the restricted area in the server 3 via the network 5. The server 3 transmits the restricted area information to the participant terminal 2 via the network 5. The participant terminal 2 specifies the restricted area in the virtual reality space using the restricted area information acquired from the server 3. Note that a setter who sets the restricted area information using the management terminal 4 is, for example, a creator of the virtual reality space, a person related to an event held in the virtual reality space, a creator of the virtual reality space created by copying the existing virtual reality space information so that only a specific approver can participate, or a person permitted to any of these.

Figure 2:
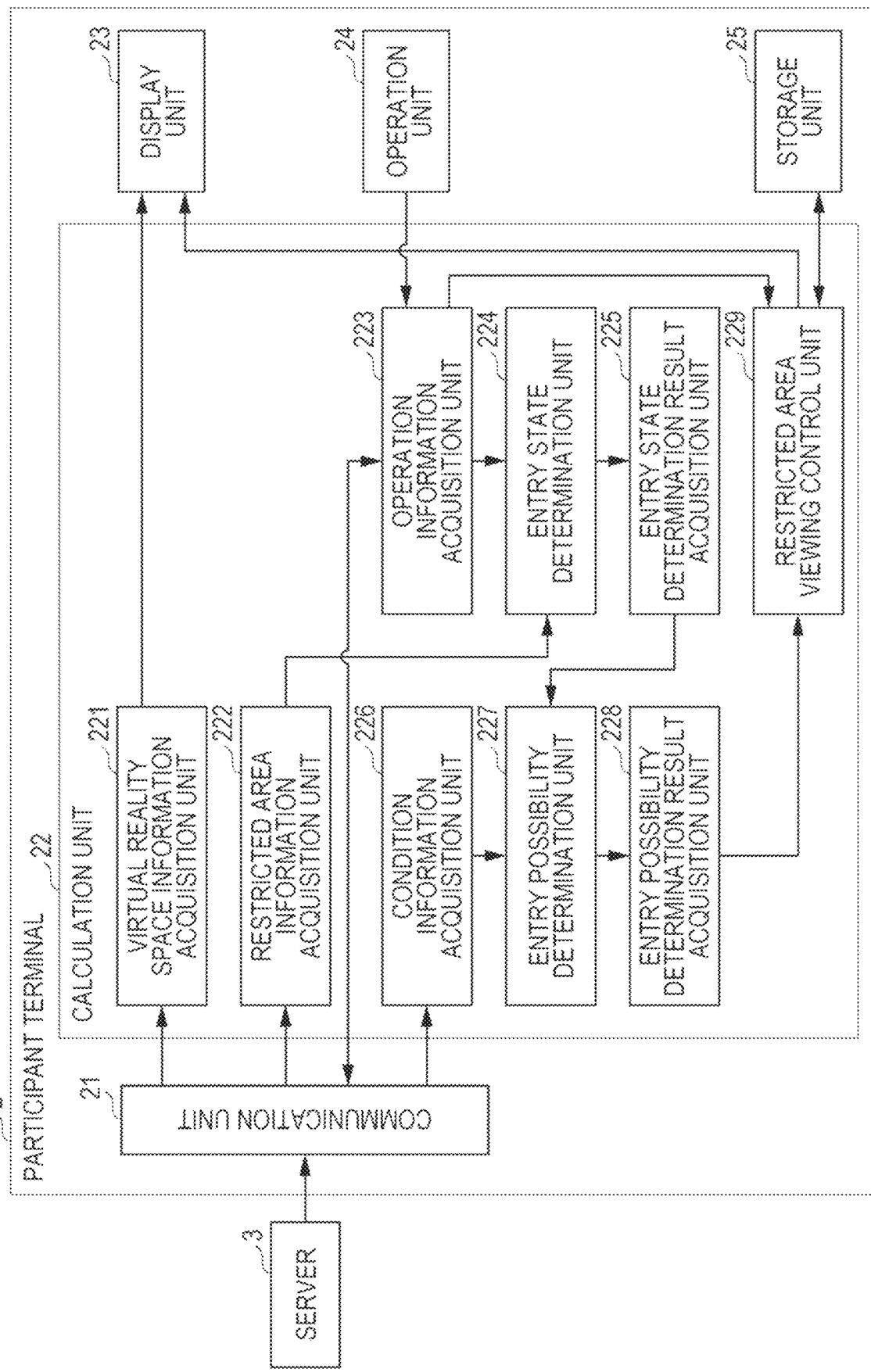
FIG. 2 is a block diagram illustrating a configuration of a participant terminal according to the first embodiment.

FIG. 2 is a block diagram illustrating a configuration of the participant terminal 2. As illustrated in FIG. 2, the participant terminal 2 is a terminal device including a communication unit 21, a calculation unit 22, a display unit 23, an operation unit 24, and a storage unit 25. The communication unit 21 is a communication interface for communicating with other devices. The communication unit 21 is a communication device capable of mobile communication by a communication method such as LTE, 3G, 4G, or 5G, for example, and communicates with another device such as the server 3 connected to the network 5. In addition, the communication unit 21 may include a short-range wireless communication unit such as Bluetooth (registered trademark). Note that, in FIG. 2, description of the network 5 between the server 3 and the participant terminal 2 is omitted.

The calculation unit 22 controls the overall operation of the participant terminal 2. For example, in a case where a virtual reality space participation application is installed in the participant terminal 2, the calculation unit 22 executes the virtual reality space participation application to thereby implement various functions for allowing the avatar to participate in the virtual reality space. Further, for example, in a case where the virtual reality space participation application is executed in the server 3, the calculation unit 22 implements the various functions for allowing the avatar to participate in the virtual reality space by receiving an instruction from the server 3.

The display unit 23 is a display device included in the participant terminal 2. The display unit 23 is, for example, a liquid crystal display (LCD) or an organic electroluminescence (EL) display device. In a case where the participant terminal 2 is a head mounted display, a display method of the display unit 23 is a non-transmissive type.

The operation unit 24 is an input device that receives an operation on a virtual reality space screen displayed on the display unit 23. In a case where the participant terminal 2 is a smartphone or a tablet terminal, the operation unit 24 is, for example, a touch panel provided integrally with the screen of the display unit 23. In a case where the participant terminal 2 is a PC, the operation unit 24 is, for example, a mouse or a keyboard. In a case where the participant terminal 2 is the head mounted display, the operation unit 24 is the head mounted display and the controller used together with the head mounted display.

The storage unit 25 is a storage device that stores an application program such as a virtual reality space participation application and stores data used for calculation processing of the calculation unit 22. In the storage unit 25, for example, the virtual reality space information, the restricted area information, and the like received from the server 3 via the network 5 by the communication unit 21 are stored.

The calculation unit 22 includes a virtual reality space information acquisition unit 221, a restricted area information acquisition unit 222, an operation information acquisition unit 223, an entry state determination unit 224, an entry state determination result acquisition unit 225, a condition information acquisition unit 226, an entry possibility determination unit 227, an entry possibility determination result acquisition unit 228, and a restricted area viewing control unit 229. The calculation unit 22 executes the virtual reality space participation application stored in the storage unit 25, thereby implementing respective functions of the virtual reality space information acquisition unit 221, the restricted area information acquisition unit 222, the operation information acquisition unit 223, the entry state determination unit 224, the entry state determination result acquisition unit 225, the condition information acquisition unit 226, the entry possibility determination unit 227, the entry possibility determination result acquisition unit 228, and the restricted area viewing control unit 229.

The virtual reality space information acquisition unit 221 acquires the virtual reality space information from the server 3. The server 3 manages the virtual reality space information for each virtual reality space for one or more virtual reality spaces. For example, the virtual reality space information acquisition unit 221 uses the communication unit 21 to acquire simple display data for simply displaying the one or more virtual reality spaces from the server 3 via the network 5, and uses the simple display data to simply display the one or more virtual reality spaces on the display unit 23. The user designates a desired virtual reality space from the virtual reality space simply displayed on the display unit 23 using the operation unit 24. The virtual reality space information acquisition unit 221 uses the communication unit 21 to acquire the virtual reality space information of the designated virtual reality space from the server 3 via the network 5, and outputs the acquired virtual reality space information to the display unit 23. The display unit 23 displays the virtual reality space by using the virtual reality space information.

The restricted area information acquisition unit 222 acquires the restricted area information from the server 3. For example, the server 3 manages the restricted area information for each piece of the virtual reality space information of the virtual reality space for the one or more virtual reality spaces in which the restricted area is set. A plurality of restricted areas may be set in one virtual reality space, and in this case, the server 3 manages a plurality of pieces of restricted area information for the virtual reality space information of one virtual reality space. The restricted area information acquisition unit 222 uses the communication unit 21 to acquire the restricted area information corresponding to the virtual reality space information acquired by the virtual reality space information acquisition unit 221 from the server 3 via the network 5. Then, the restricted area information acquisition unit 222 outputs the restricted area information acquired from the server 3 to the restricted area viewing control unit 229, thereby setting the area in the virtual reality space displayed on the display unit 23 as a restriction target.

The operation information acquisition unit 223 acquires operation information for operating the avatar. The avatar is arranged in the virtual reality space displayed on the display unit 23, and can be operated by an operation using the operation unit 24. The operation information acquisition unit 223 acquires operation information indicating an operation by the participant using the operation unit 24, and outputs the operation information to the restricted area viewing control unit 229. In a case of determining whether or not the avatar is in a state about to enter the restricted area, the operation information is used to determine this entry state. Further, the operation information acquisition unit 223 transmits the operation information to the server 3 via the network 5 using the communication unit 21.

The entry state determination unit 224 determines whether or not the avatar is in a state about to enter the restricted area on the basis of the restricted area information and the operation information. The state of the avatar about to enter the restricted area means, for example, a state in which at least a part of the avatar has actually entered the restricted area from a state in which the entire body of the avatar exists outside the restricted area, or a state in which at least a part of the avatar has actually entered a proximity determination area from a state in which the entire body of the avatar exists outside the proximity determination area (described later).

The avatar includes objects representing respective parts of a head, a torso, arms, legs, and the like, and data representing bones (skeletons) connecting these objects. The respective parts of the avatar move in accordance with movement of the bones. For example, the entry state determination unit 224 determines whether or not the coordinates of the bones of the avatar indicated by the operation information have entered the restricted area indicated by the restricted area information, thereby determining whether or not the avatar is in a state about to enter the restricted area. Further, the entry state determination unit 224 may determine whether or not the avatar is in a state about to enter the restricted area by determining whether or not the coordinates of the bones of the avatar have entered an area (hereinafter referred to as an "proximity determination area") set to cover the restricted area at a predetermined distance from the entire outer edge of the restricted area. The predetermined distance is, for example, the longest distance at which the virtual reality space information set in the restricted area can be viewed from the outside of the restricted area. In a case where the entry state of the avatar into the restricted area is determined using the coordinates of the bones, the entry state determination unit 224 determines that the avatar is about to enter the restricted area, for example, when the coordinates of any one of the plurality of bones constituting the avatar enters the restricted area (or the proximity determination area).

In addition, the entry state determination unit 224 may determine whether or not the avatar is in a state about to enter the restricted area by determining whether or not center coordinates of the avatar indicated by the operation information have entered the restricted area indicated by the restricted area information. Here, the center coordinates of the avatar are, for example, coordinates of the center of gravity of a three-dimensional object representing the avatar. Further, the entry state determination unit 224 may determine whether or not the avatar is in a state about to enter the restricted area by determining whether or not the center coordinates of the avatar have entered the proximity determination area.

By including the entry state determination unit 224, the participant terminal 2 can determine whether or not the avatar is in a state about to enter the restricted area in the virtual reality space. Further, the entry state determination unit 224 can accurately determine whether or not the avatar is in a state about to enter the restricted area by using the coordinates of the bones of the avatar or the center coordinates of the avatar (hereinafter these are collectively referred to as "avatar coordinates") indicated by the operation information.

The entry state determination result acquisition unit 225 acquires an entry state determination result. Further, the entry state determination result is a result of determining whether or not the avatar is in a state about to enter the restricted area on the basis of the restricted area information and the operation information. The entry state determination result acquisition unit 225 acquires the entry state determination result from the entry state determination unit 224. The entry state determination result acquisition unit 225 outputs the entry state determination result acquired from the entry state determination unit 224 to the entry possibility determination unit 227.

The condition information acquisition unit 226 acquires condition information indicating a condition for determining whether or not entry is possible from the server 3. For example, the server 3 manages the condition information for each restricted area. The condition information acquisition unit 226 uses the communication unit 21 to acquire the condition information corresponding to the restricted area information acquired by the restricted area information acquisition unit 222 from the server 3 via the network 5, and outputs the acquired condition information to the entry possibility determination unit 227.

The condition information is, for example, information indicating a condition under which entry of the avatar to the restricted area is possible. In a case where the user causes his/her avatar to participate in the virtual reality space using the participant terminal 2, information regarding the user such as a user ID for using the service of the virtual reality space is also input to the participant terminal 2. That is, the participant terminal 2 has information regarding the user participating in the virtual reality space as the avatar using the participant terminal 2, that is, information regarding the participant. Therefore, the condition information can be information indicating a condition in which whether or not entry of the avatar to the restricted area is possible can be determined using the information regarding the participant of the participant terminal 2. The condition information is, for example, information indicating at least one of a condition that a participant corresponding to the avatar is a creator who has created the virtual reality space, a condition that the participant is an event-related person related to an event held in the virtual reality space, a condition that the participant is a billed person who is billed for using the virtual reality space, a condition that the participant is a person who has obtained a ticket for using the virtual reality space, or a condition that a time zone in which the avatar is about to enter the restricted area is an available time zone of the restricted area. In the server 3, for example, a condition of a participant whose avatar can enter the restricted area set in the virtual reality space is registered, and condition information indicating the condition is managed for each restricted area. The condition information acquisition unit 226 acquires the condition information set in the restricted area corresponding to the virtual reality space information acquired by the virtual reality space information acquisition unit 221 from the condition information managed for each restricted area by the server 3.

In addition, the condition information may indicate a condition under which entry of the avatar to the restricted area is not possible. The condition information in this case is, for example, information indicating at least one of a condition that the participant corresponding to the avatar is a person who has performed an illicit act in the past in the virtual reality space, or a condition that the participant corresponding to the avatar is a person who intends to illicitly enter the restricted area. For example, the server 3 detects whether the participant corresponding to the avatar in the virtual reality space is a person who has performed an illicit act in the past in the virtual reality space or a person who intends to illicitly enter the restricted area, and stores information for specifying the detected participant as condition information. The information for specifying the detected participant is, for example, the user ID of the user who is the participant. The condition information acquisition unit 226 acquires the condition information set in the restricted area corresponding to the virtual reality space information acquired by the virtual reality space information acquisition unit 221 from the condition information managed for each restricted area by the server 3.

The entry possibility determination unit 227 determines whether or not entry of the avatar to the restricted area is possible on the basis of the condition information. For example, the entry possibility determination unit 227 acquires the entry state determination result from the entry state determination result acquisition unit 225 and acquires the condition information from the condition information acquisition unit 226. In a case where the entry state determination result indicates that the avatar is in a state about to enter the restricted area, the entry possibility determination unit 227 determines whether or not the participant corresponding to the avatar in the state about to enter the restricted area is a participant whose entry is possible and who is indicated by the condition information, or determines whether or not the participant is a participant whose entry is not possible and who is indicated by the condition information, thereby determining whether or not entry of the avatar to the restricted area is possible.

In a case where the entry state determination result indicates that the avatar is in a state about to enter the restricted area, the entry possibility determination result acquisition unit 228 acquires an entry possibility determination result that is a result of determination regarding whether or not entry of the avatar to the restricted area is possible. The entry possibility determination result acquisition unit 228 acquires the entry possibility determination result from the entry possibility determination unit 227. The entry possibility determination result acquisition unit 228 outputs the acquired entry possibility determination result to the restricted area viewing control unit 229.

The restricted area viewing control unit 229 enables viewing of the virtual reality space information in the restricted area in a case where the entry possibility determination result indicates that entry is possible, and disables viewing of the virtual reality space information in the restricted area in a case where the entry possibility determination result indicates that entry is not possible. For example, the restricted area viewing control unit 229 disables viewing of the virtual reality space information in the restricted area by pushing the avatar out of the restricted area, replacing the virtual reality space information in the restricted area with other virtual reality space information, masking a part of the virtual reality space information in the restricted area, blurring the restricted area, or transferring the avatar about to enter the restricted area to an area other than the restricted area.

Figure 3:
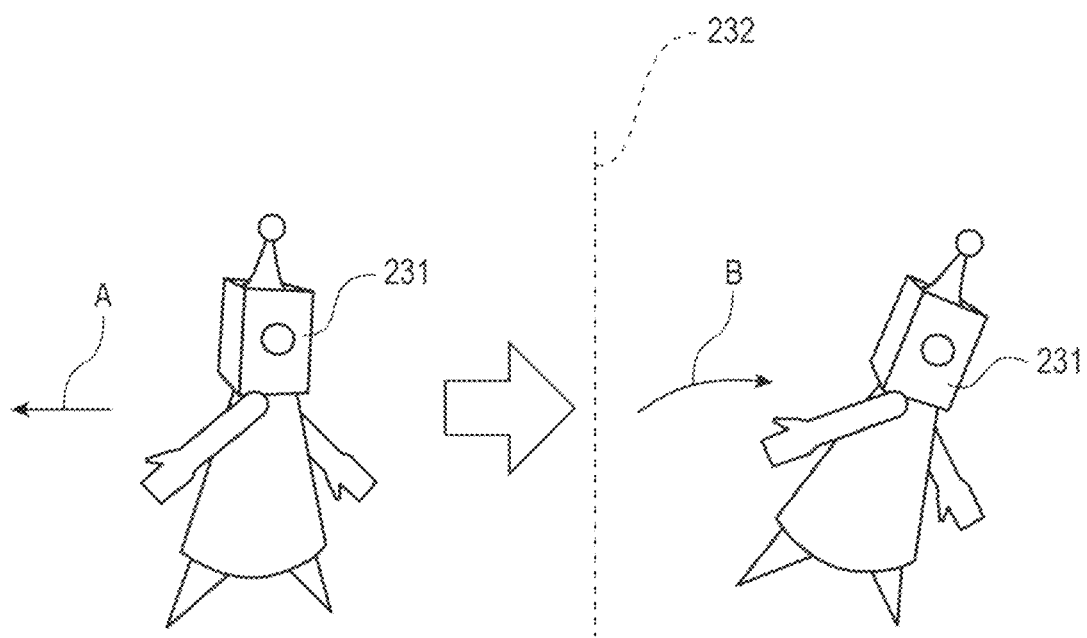
FIG. 3 is a schematic view illustrating a first example of unviewable processing of a restricted area.

FIG. 3 is a schematic view illustrating a first example of the restricted area unviewable processing. As illustrated on the left side of an outlined arrow in FIG. 3, it is assumed that an avatar 231 moves in the direction of an arrow A and in a state about to enter a restricted area. The avatar 231 is an avatar whose entry to the restricted area is determined to be not possible. In a case where it is determined that entry of the avatar 231 to the restricted area is not possible, the restricted area viewing control unit 229 sets the avatar coordinates to coordinates such that the avatar 231 moves in the direction outside the restricted area even if the operation information indicates the operation of further moving the avatar 231 in the restricted area direction. As a result, as illustrated on the right side of the outlined arrow in FIG. 3, the avatar 231 moves so as to be pushed in the direction of an arrow B even if the avatar attempts to further enter the restricted area direction from the position near an outer edge 232 of the restricted area. Thus, the participant corresponding to the avatar 231 becomes unable to view the virtual reality space information in the restricted area. Note that the avatar coordinates in this case are also transmitted to the server 3.

Figure 4:
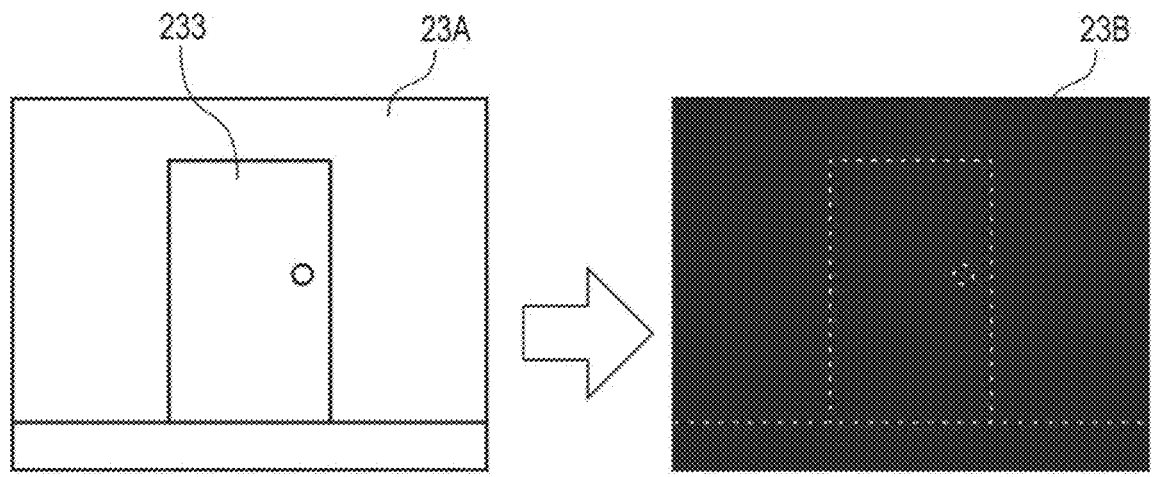
FIG. 4 is a schematic view illustrating a second example of the unviewable processing of the restricted area.

FIG. 4 is a schematic view illustrating a second example of the restricted area unviewable processing. In the second example, the original virtual reality space information in the restricted area is replaced with other virtual reality space information as the unviewable processing of the restricted area.

It is assumed that the display unit 23 displays a screen 23A illustrated on the left side of an outlined arrow in FIG. 4. On the screen 23A, a door 233 provided on a wall of a room that is a restricted area is displayed on the basis of the original virtual reality space information in the restricted area. In a case where it is determined that entry of the avatar corresponding to the participant to the restricted area illustrated in the screen 23A is not possible, the restricted area viewing control unit 229 displays, on the display unit 23, a screen 23B obtained by darkening the restricted area illustrated in the screen 23A on the basis of the virtual reality space information after replacement, for example, as illustrated on the right side of the outlined arrow in FIG. 4. In the screen 23B illustrated in FIG. 4, the shape of the door or the like displayed on the screen 23A is indicated by a white broken line, but the screen 23B to be actually displayed is a screen filled in black, and the shape of the door or the like is invisible. By visually recognizing the darkened restricted area, the participant can grasp that the restricted area is an inaccessible area. Further, the restricted area viewing control unit 229 can make the restricted area unviewable by setting the darkened door 233 not to open and not allowing the avatar to enter the restricted area. In addition, the restricted area viewing control unit 229 can make the inside of the restricted area unviewable by setting such that the avatar can open the door 233 and enter the restricted area and then displaying the entire inside of the restricted area in a dark state.

In the above description, an example has been described in which the virtual reality space information after replacement is information indicating a darkened screen, that is, a screen filled with black, but instead of this, the virtual reality space information after replacement may be, for example, information indicating a screen filled with a color other than black, such as a screen filled with white, or a screen on which an object or the like different from the original virtual reality space information is arranged.

Note that the example in which the original virtual reality space information in the restricted area is replaced with other virtual reality space information has been described above, but instead of this, by superimposing and displaying a mask image on a part of the virtual reality space information in the restricted area, that is, by masking a part of the virtual reality space information in the restricted area, the inside of the restricted area can be made unviewable.

Figure 5:
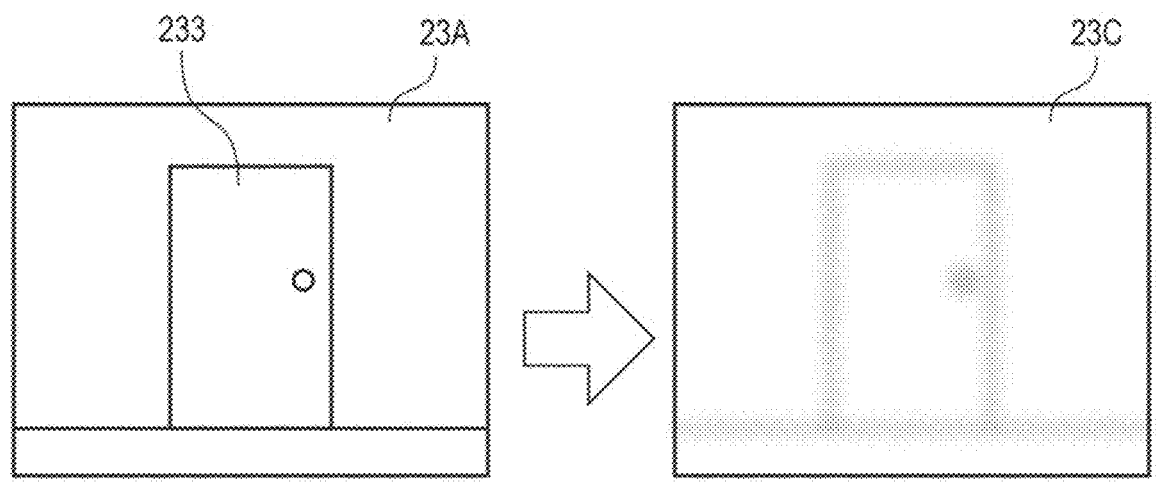
FIG. 5 is a schematic view illustrating a third example of the unviewable processing of the restricted area.

FIG. 5 is a schematic view illustrating a third example of the restricted area unviewable processing. It is assumed that the display unit 23 displays the screen 23A illustrated on the left side of an outlined arrow in FIG. 5. On the screen 23A, the door 233 provided on a wall of a room which is a restricted area is displayed. In a case where it is determined that entry of the avatar corresponding to the participant to the restricted area illustrated in the screen 23A is not possible, the restricted area viewing control unit 229 causes the display unit 23 to display a screen 23C in which the restricted area illustrated in the screen 23A is blurred, for example, as illustrated on the right side of the outlined arrow in FIG. 5. By visually recognizing the blurred restricted area, the participant can grasp that the restricted area is an inaccessible area. Further, the restricted area viewing control unit 229 sets the blurred door 233 not to open, and does not allow the avatar to enter the restricted area, so that the restricted area can be made unviewable. In addition, the restricted area viewing control unit 229 can make the inside of the restricted area unviewable by setting such that the avatar can open the door 233 and enter the restricted area and then displaying the entire inside of the restricted area in a blurred manner.

Figure 6:
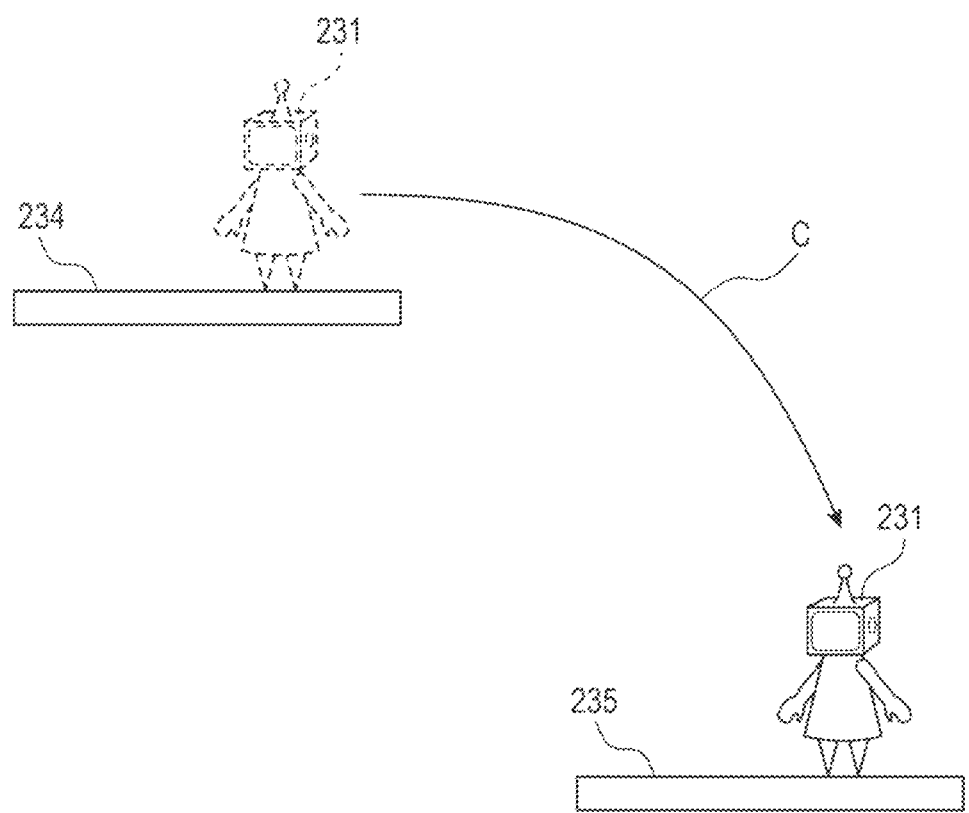
FIG. 6 is a schematic view illustrating a fourth example of the unviewable processing of the restricted area.

FIG. 6 is a schematic view illustrating a fourth example of the restricted area unviewable processing. In the virtual reality space illustrated in FIG. 6, a restricted area 234 is an area in which it is determined that entry of the avatar 231 is not possible, and an area 235 is an area other than the restricted area. For example, in a case where it is determined that entry of the avatar 231 to the restricted area 234 is not possible, the restricted area viewing control unit 229 sets the avatar coordinates to such coordinates that the avatar 231 is transferred to the area 235 in the direction of an arrow C even if the operation information indicates that the avatar 231 is moved to the position indicated by a broken line. Even when attempting to enter the restricted area 234, the avatar 231 is transferred to the area 235 other than the restricted area 234. Thus, the participant corresponding to the avatar 231 becomes unable to view the virtual reality space information in the restricted area. Note that the avatar coordinates in this case are also transmitted to the server 3.

Further, the virtual reality space information acquisition unit 221 acquires only the virtual reality space information excluding the virtual reality space information in the restricted area from the server 3 at a time point before the avatar participates in the virtual reality space. In a case where the entry possibility determination result indicates that entry is possible after the avatar participates in the virtual reality space, the virtual reality space information acquisition unit 221 acquires the virtual reality space information in the restricted area from the server 3. In a case where the entry possibility determination result indicates that entry of the avatar to the restricted area is possible, the restricted area viewing control unit 229 sets the virtual reality space information in the restricted area to be viewable by the participant corresponding to the avatar that has entered the restricted area.

After the avatar participates in the virtual reality space, in a case where the entry possibility determination result indicates that entry is not possible, the virtual reality space information acquisition unit 221 does not continuously perform the processing of acquiring the virtual reality space information in the restricted area. That is, in a case where the determination result is the entry possibility determination result indicating that entry of the avatar to the restricted area is not possible, the virtual reality space information in the restricted area is not acquired from the server 3. In this case, the restricted area viewing control unit 229 disables viewing of the virtual reality space information in the restricted area by the participant corresponding to the avatar. For example, a void space is set in the restricted area, or entry into the restricted area is prevented. Thus, the participant terminal 2 can control the viewing of the virtual reality space information in the restricted area on the basis of the entry possibility determination result.

Figure 7:
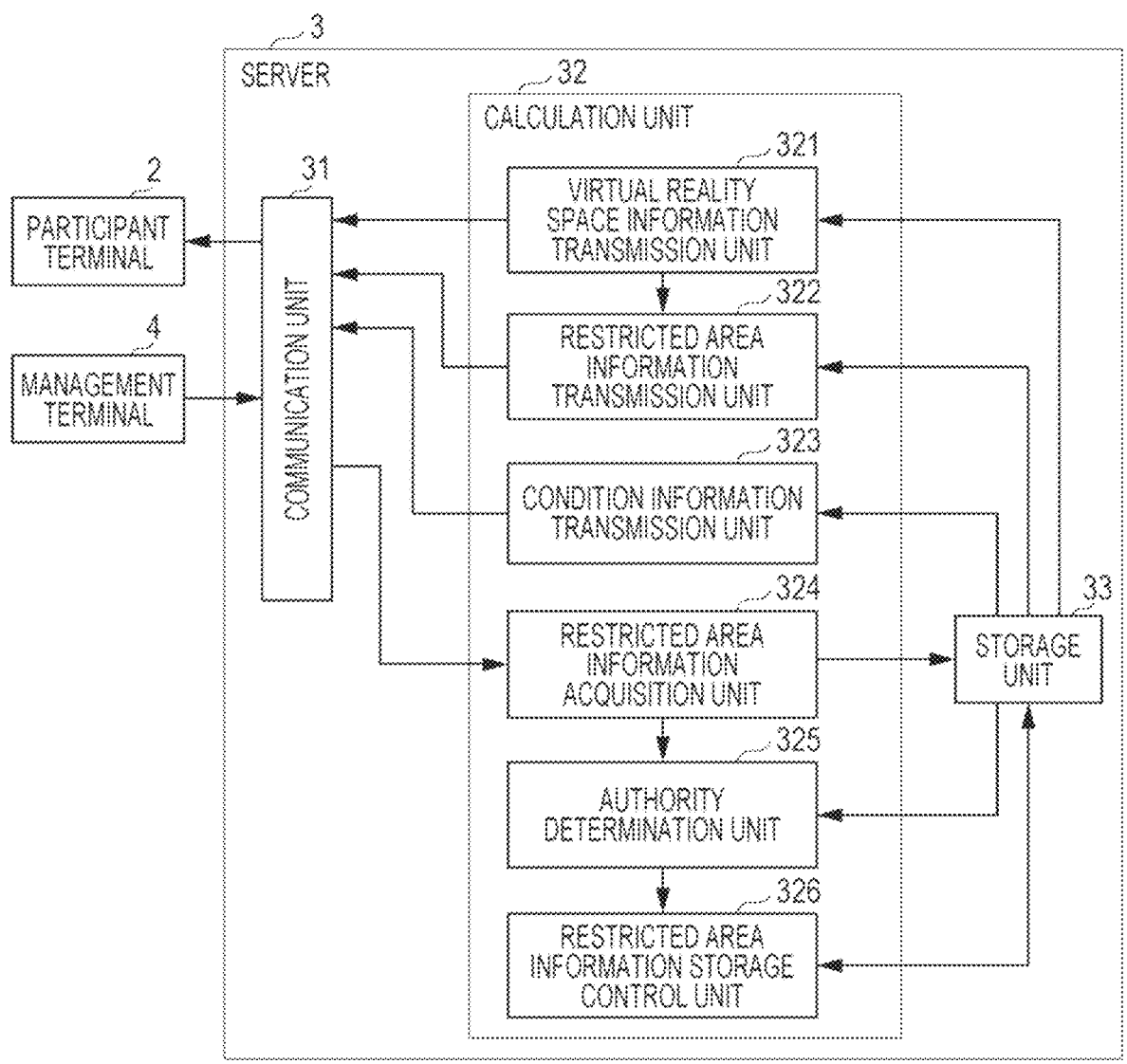
FIG. 7 is a block diagram illustrating a configuration of a server according to the first embodiment.

FIG. 7 is a block diagram illustrating a configuration of the server 3 according to the first embodiment. As illustrated in FIG. 7, the server 3 includes a communication unit 31, a calculation unit 32, and a storage unit 33. The communication unit 31 communicates with the participant terminal 2 or the management terminal 4 via the network 5. For example, the communication unit 31 can communicate with the participant terminal 2 having the communication unit 21, which is a communication device capable of mobile communication by a communication method such as LTE, 3G, 4G, or 5G, via the network 5. The calculation unit 32 controls the overall operation of the server 3. The calculation unit 32 executes a virtual reality space providing application to thereby implements various functions.

The storage unit 33 stores the virtual reality space providing application and information used for calculation processing of the calculation unit 32. For example, the storage unit 33 stores the virtual reality space information, the restricted area information, and the condition information in association with each other. In addition, in a case where the server 3 executes the virtual reality space participation application in order to provide a participation function of the participant terminal 2 in the virtual reality space via the network 5, the virtual reality space participation application is also stored in the storage unit 33.

The calculation unit 32 includes a virtual reality space information transmission unit 321, a restricted area information transmission unit 322, a condition information transmission unit 323, a restricted area information acquisition unit 324, an authority determination unit 325, and a restricted area information storage control unit 326. The calculation unit 32 executes the virtual reality space providing application, thereby implementing respective functions of the virtual reality space information transmission unit 321, the restricted area information transmission unit 322, the condition information transmission unit 323, the restricted area information acquisition unit 324, the authority determination unit 325, and the restricted area information storage control unit 326. Note that, in order to display the avatar corresponding to the participant participating using another participant terminal 2 on the display unit 23 of each participant terminal 2 in the plurality of participant terminals 2, the server 3 also includes an acquisition unit that acquires the operation information by acquiring the operation information from each participant terminal 2, but illustration thereof is omitted in FIG. 7.

The virtual reality space information transmission unit 321 acquires the virtual reality space information from the storage unit 33 and transmits the virtual reality space information to the participant terminal 2. The storage unit 33 stores the virtual reality space information for each virtual reality space for the one or more virtual reality spaces. The virtual reality space information transmission unit 321 acquires the virtual reality space information of the virtual reality space designated in the participant terminal 2 from the storage unit 33. Then, the virtual reality space information transmission unit 321 uses the communication unit 31 to transmit the acquired virtual reality space information to the participant terminal 2 via the network 5. Thus, the participant terminal 2 can acquire the virtual reality space information from the server 3.

The restricted area information transmission unit 322 acquires the restricted area information from the storage unit 33, and transmits the acquired restricted area information to the participant terminal 2. The storage unit 33 stores the restricted area information for each piece of virtual reality space information of the virtual reality space for the one or more virtual reality spaces in which the restricted area is set. The restricted area information transmission unit 322 acquires the restricted area information regarding the virtual reality space designated in the participant terminal 2 from the storage unit 33. This restriction information is the same as restriction information for the virtual reality space indicated by the virtual reality space information transmitted by the virtual reality space information transmission unit 321 to the participant terminal 2. Then, the restricted area information transmission unit 322 uses the communication unit 31 to transmit the acquired restricted area information to the participant terminal 2 via the network 5. Thus, the participant terminal 2 can acquire the restricted area information from the server 3.

The condition information transmission unit 323 acquires the condition information from the storage unit 33 and transmits the condition information to the participant terminal 2. The storage unit 33 stores the restricted area information for each restricted area. For example, the condition information transmission unit 323 acquires the condition information corresponding to the restricted area information transmitted by the restricted area information transmission unit 322 from the storage unit 33, and transmits the acquired condition information to the participant terminal 2 via the network 5 using the communication unit 31. Thus, the participant terminal 2 can acquire the condition information from the server 3.

The restricted area information acquisition unit 324 is a server-side restricted area information acquisition unit that acquires the restricted area information from the management terminal 4. For example, the management terminal 4 manages the restricted area information indicating a restricted area in the virtual reality space. The setter of the restricted area transmits the restricted area information to the server 3 together with the ID (hereinafter referred to as a "setter ID") of the setter using the management terminal 4. In a case where the setter is also a participant, the setter ID may be the same as the user ID of the user who is the participant. The restricted area information acquisition unit 324 uses the communication unit 31 to acquire the restricted area information transmitted from the management terminal 4 from the management terminal 4 via the network 5. The restricted area information storage control unit 326 causes the restricted area information acquired by the restricted area information acquisition unit 324 from the management terminal 4 to be stored in the storage unit 33 in association with the virtual reality space information. Thus, the server 3 can acquire the restricted area information set by the setter.

The authority determination unit 325 determines whether or not the restricted area information acquired from the management terminal 4 is transmitted from a setter having restricted area setting authority. For example, the storage unit 33 stores a setter ID for specifying the setter having the restricted area setting authority. The authority determination unit 325 collates the setter ID corresponding to the restricted area information acquired by the restricted area information acquisition unit 324 with the setter ID stored in the storage unit 33, and determines that the setter ID is the restricted area information transmitted from the setter having the restricted area setting authority when the setter ID matches the setter ID. Further, if they do not match, the authority determination unit 325 determines that it is not the restricted area information transmitted from the setter having the restricted area setting authority. The authority determination unit 325 outputs the determination result to the restricted area information storage control unit 326. When the authority determination unit 325 determines that the restricted area information is transmitted from the setter having the restricted area setting authority, the restricted area information storage control unit 326 causes the restricted area information acquired from the management terminal 4 to be stored in the storage unit 33. When the authority determination unit 325 determines that the restricted area information is not transmitted from the setter having the restricted area setting authority, the restricted area information storage control unit 326 discards the restricted area information acquired from the management terminal 4 without storing the restricted area information in the storage unit 33. Thus, the server 3 can receive the setting of the restricted area information by an appropriate setter.

Note that, as described above, the setter having the restricted area setting authority is, for example, a creator of the virtual reality space, a person related to an event held in the virtual reality space, a creator of the virtual reality space created by copying the existing virtual reality space information so that only a specific approver can participate, or a person permitted to any of these.

In addition, the virtual reality space providing system 1 may be such that the setter can set condition information indicating a condition for determining whether or not entry to the restricted area is possible with respect to setting of a new restricted area or an existing restricted area. In this case, the participant terminal 2 transmits condition information associated with the restricted area to the server 3.

In addition, in the virtual reality space providing system 1, the setter may instruct to cancel the existing restricted area. In this case, the participant terminal 2 transmits, to the server 3, information instructing release of the restricted area associated with the existing restricted area. Alternatively, the virtual reality space providing system 1 may be such that, for a new restricted area or an existing restricted area, information designating a period during which the area exists can be set. In this case, the participant terminal 2 transmits information designating the existence period associated with the restricted area to the server 3. The server 3 sets or cancels the corresponding restricted area on the basis of the information designating the existence period.

In addition, the server 3 may notify the management terminal 4 of information indicating a status as to whether or not the restricted area information acquired from the management terminal 4 is stored in the storage unit, together with, for example, a determination result by the authority determination unit 325. Thus, the setter can know whether the setting of the restricted area is successful based on the restricted area information transmitted to the server 3 by the setter using the management terminal 4.

Although FIG. 2 illustrates a mode in which the participant terminal 2 includes the entry state determination unit 224 and the entry possibility determination unit 227, either or both of the entry state determination and the entry possibility determination may be performed by a server. Hereinafter, a mode in which both the entry state determination and the entry possibility determination are performed by the server will be described.

Figure 8:
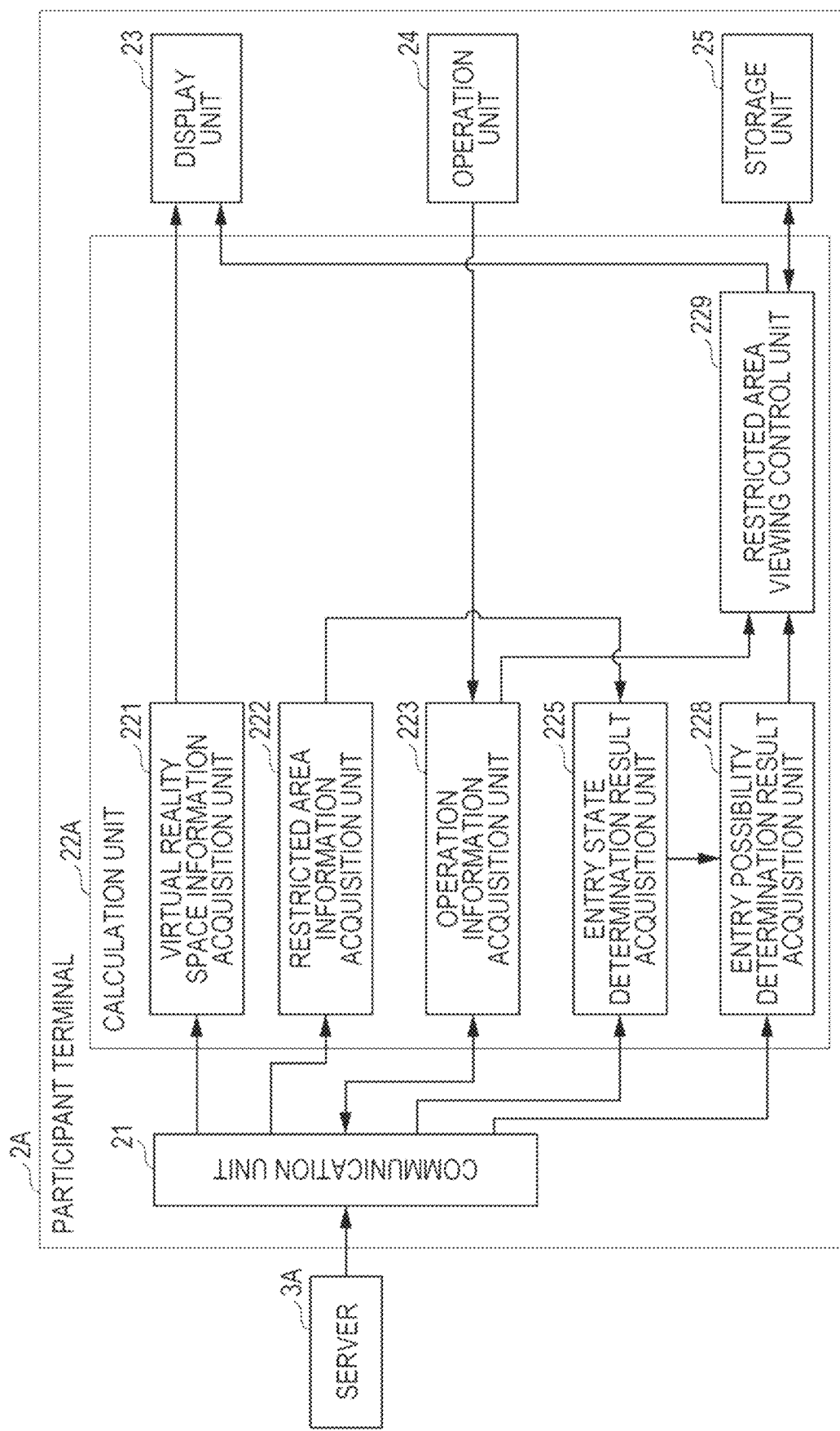
FIG. 8 is a block diagram illustrating a configuration of a first modification of the participant terminal according to the first embodiment.

FIG. 8 is a block diagram illustrating a configuration of a participant terminal 2A which is a first modification of the participant terminal 2. In FIG. 8, the participant terminal 2A is a terminal device corresponding to the server 3A described later with reference to FIG. 9, and includes the communication unit 21, a calculation unit 22A, the display unit 23, the operation unit 24, and the storage unit 25. The calculation unit 22A controls the overall operation of the participant terminal 2A. For example, in a case where the virtual reality space participation application is installed in the participant terminal 2A, the calculation unit 22A executes the virtual reality space participation application to thereby implement various functions for participating in the virtual reality space. Further, for example, in a case where the virtual reality space participation application is executed in the server 3A, the calculation unit 22A implements various functions for participating in the virtual reality space by receiving an instruction from the server 3A.

The calculation unit 22A includes the virtual reality space information acquisition unit 221, the restricted area information acquisition unit 222, the operation information acquisition unit 223, the entry state determination result acquisition unit 225, the entry possibility determination result acquisition unit 228, and the restricted area viewing control unit 229. The calculation unit 22 executes the virtual reality space participation application stored in the storage unit 25, thereby implementing respective functions of the virtual reality space information acquisition unit 221, the restricted area information acquisition unit 222, the operation information acquisition unit 223, the entry state determination result acquisition unit 225, the entry possibility determination result acquisition unit 228, and the restricted area viewing control unit 229.

The virtual reality space information acquisition unit 221 uses the communication unit 21 to acquire the virtual reality space information of the virtual reality space from the server 3A via the network 5, and outputs the virtual reality space information to the display unit 23. The display unit 23 displays the virtual reality space by using the virtual reality space information. The restricted area information acquisition unit 222 uses the communication unit 21 to acquire the restricted area information corresponding to the virtual reality space information acquired by the virtual reality space information acquisition unit 221 from the server 3A via the network 5.

The operation information acquisition unit 223 acquires the operation information for operating the avatar. The operation information acquisition unit 223 acquires the operation information indicating an operation by the participant using the operation unit 24, and outputs the operation information to the restricted area viewing control unit 229. Further, the operation information acquisition unit 223 transmits the operation information to the server 3A via the network 5 using the communication unit 21.

The entry state determination result acquisition unit 225 acquires the entry state determination result from the server 3A. For example, the entry state determination result acquisition unit 225 uses the communication unit 21, acquires the entry state determination result from the server 3A via the network 5, and outputs the entry state determination result to the entry possibility determination result acquisition unit 228.

The entry possibility determination result acquisition unit 228 acquires the entry possibility determination result from the server 3A. For example, in a case where the entry state determination result acquired by the entry state determination result acquisition unit 225 indicates that the avatar is in a state about to enter the restricted area, the entry possibility determination result acquisition unit 228 acquires, from the server 3A, the entry possibility determination result that is a result of determination regarding whether or not entry of the avatar to the restricted area is possible. The entry possibility determination result acquisition unit 228 outputs the acquired entry possibility determination result to the restricted area viewing control unit 229. The restricted area viewing control unit 229 enables viewing of the virtual reality space information in the restricted area in a case where the entry possibility determination result acquired by the entry possibility determination result acquisition unit 228 indicates that entry is possible, and disables viewing of the virtual reality space information in the restricted area in a case where the entry possibility determination result indicates that entry is not possible.

Figure 9:
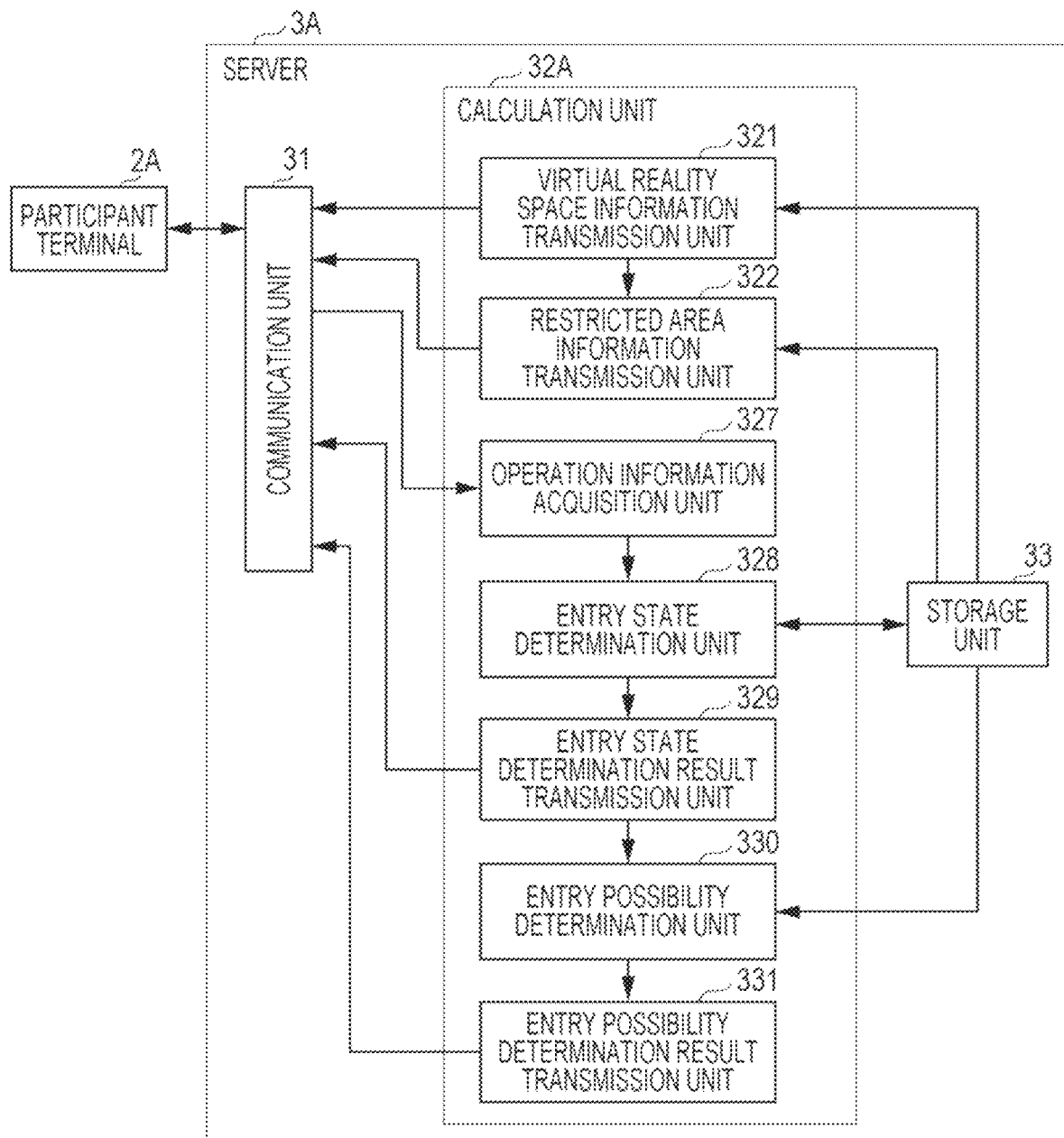
FIG. 9 is a block diagram illustrating a configuration of a first modification of the server according to the first embodiment.

FIG. 9 is a block diagram illustrating a configuration of a server 3A which is a first modification of the server 3. As illustrated in FIG. 9, the server 3A includes the communication unit 31, the calculation unit 32A, and the storage unit 33. The calculation unit 32A includes the virtual reality space information transmission unit 321, the restricted area information transmission unit 322, an operation information acquisition unit 327, an entry state determination unit 328, an entry state determination result transmission unit 329, an entry possibility determination unit 330, and an entry possibility determination result transmission unit 331. The calculation unit 32A executes the virtual reality space providing application, thereby implementing respective functions of the virtual reality space information transmission unit 321, the restricted area information transmission unit 322, the operation information acquisition unit 327, the entry state determination unit 328, the entry state determination result transmission unit 329, the entry possibility determination unit 330, and the entry possibility determination result transmission unit 331.

The virtual reality space information transmission unit 321 acquires the virtual reality space information from the storage unit 33 and transmits the virtual reality space information to the participant terminal 2A. The virtual reality space information transmission unit 321 acquires the virtual reality space information of the virtual reality space designated in the participant terminal 2A from the storage unit 33. Then, the virtual reality space information transmission unit 321 uses the communication unit 31 to transmit the acquired virtual reality space information to the participant terminal 2A via the network 5. Thus, the participant terminal 2A can acquire the virtual reality space information from the server 3A.

The restricted area information transmission unit 322 acquires the restricted area information from the storage unit 33, and transmits the acquired restricted area information to the participant terminal 2A. The restricted area information transmission unit 322 uses the communication unit 31 to transmit the acquired restricted area information to the participant terminal 2A via the network 5. Thus, the participant terminal 2A can acquire the restricted area information from the server 3A.

The operation information acquisition unit 327 acquires the operation information for operating the avatar from the participant terminal 2A. For example, the operation information acquisition unit 327 uses the communication unit 31 to acquire the operation information from the participant terminal 2A via the network 5, and outputs the operation information to the entry state determination unit 328. The entry state determination unit 328 is a server-side entry state determination unit that determines whether or not the avatar is in a state about to enter the restricted area on the basis of the restricted area information acquired from the storage unit 33 and the operation information acquired by the operation information acquisition unit 327.

The entry state determination result transmission unit 329 uses the communication unit 31 to transmit the entry state determination result determined by the entry state determination unit 328 to the participant terminal 2A via the network 5. In addition, the entry state determination result transmission unit 329 outputs the entry state determination result determined by the entry state determination unit 328 to the entry possibility determination unit 330.

The entry possibility determination unit 330 is a server-side entry possibility determination unit that determines whether or not entry of the avatar to the restricted area is possible on the basis of the condition information acquired from the storage unit 33. For example, when the entry state determination result acquired from the entry state determination result transmission unit 329 indicates that the avatar is in a state about to enter the restricted area, the entry possibility determination unit 330 determines whether or not the participant corresponding to the avatar in the state about to enter the restricted area is a participant whose entry is possible and who is indicated by the condition information, thereby determining whether or not entry of the avatar to the restricted area is possible.

The entry possibility determination result transmission unit 331 uses the communication unit 31 to transmit the entry possibility determination result determined by the entry possibility determination unit 330 to the participant terminal 2A via the network 5. Thus, the participant terminal 2A can acquire the entry possibility determination result from the server 3A.

In the first modification, the server performs both the entry state determination and the entry possibility determination, and the participant terminal does not perform either determination. However, the participant terminal 2A illustrated in FIG. 8 may include the entry possibility determination unit 227 included in the participant terminal 2 illustrated in FIG. 2, and the entry possibility determination unit 330 may redetermine the entry possibility determination result performed in the participant terminal 2. For example, in a case where the participant terminal 2A includes the entry possibility determination unit 227, when determining whether or not entry of the avatar to the restricted area is possible, the participant terminal 2A transmits the entry possibility determination result to the server 3A via the network 5 using the communication unit 21. The entry possibility determination unit 330 determines again whether or not entry of the avatar to the restricted area is possible on the basis of the condition information acquired from the storage unit 33. Thereafter, the entry possibility determination result transmission unit 331 transmits the entry possibility determination result determined again by the entry possibility determination unit 330 to the participant terminal 2A via the network 5 by the communication unit 31. Thus, determination accuracy of whether or not entry of the avatar to the restricted area is possible can be improved. For example, in a case where the entry possibility determination is performed only for the participant terminal, there is a possibility that the user illicitly modifies the virtual reality space participation application so that correct determination of the entry possibility by the participant terminal cannot be performed, and the user illicitly views the inside of the restricted area. Even in such a case, it is possible to more reliably perform the entry possibility determination by enabling the server 3A side to perform the entry possibility determination. Further, since the participant terminal 2A can acquire the entry possibility determination result from the server 3A, the viewing control of the restricted area can be more accurately performed even if there is the illicit modification as described above.

In addition, the entry state determination may be performed by both the participant terminal and the server. In this case, determination accuracy of the entry state of the avatar can be improved, and a more accurate response to illicit modification can be made.

Further, the server may be configured as follows.

Figure 10:
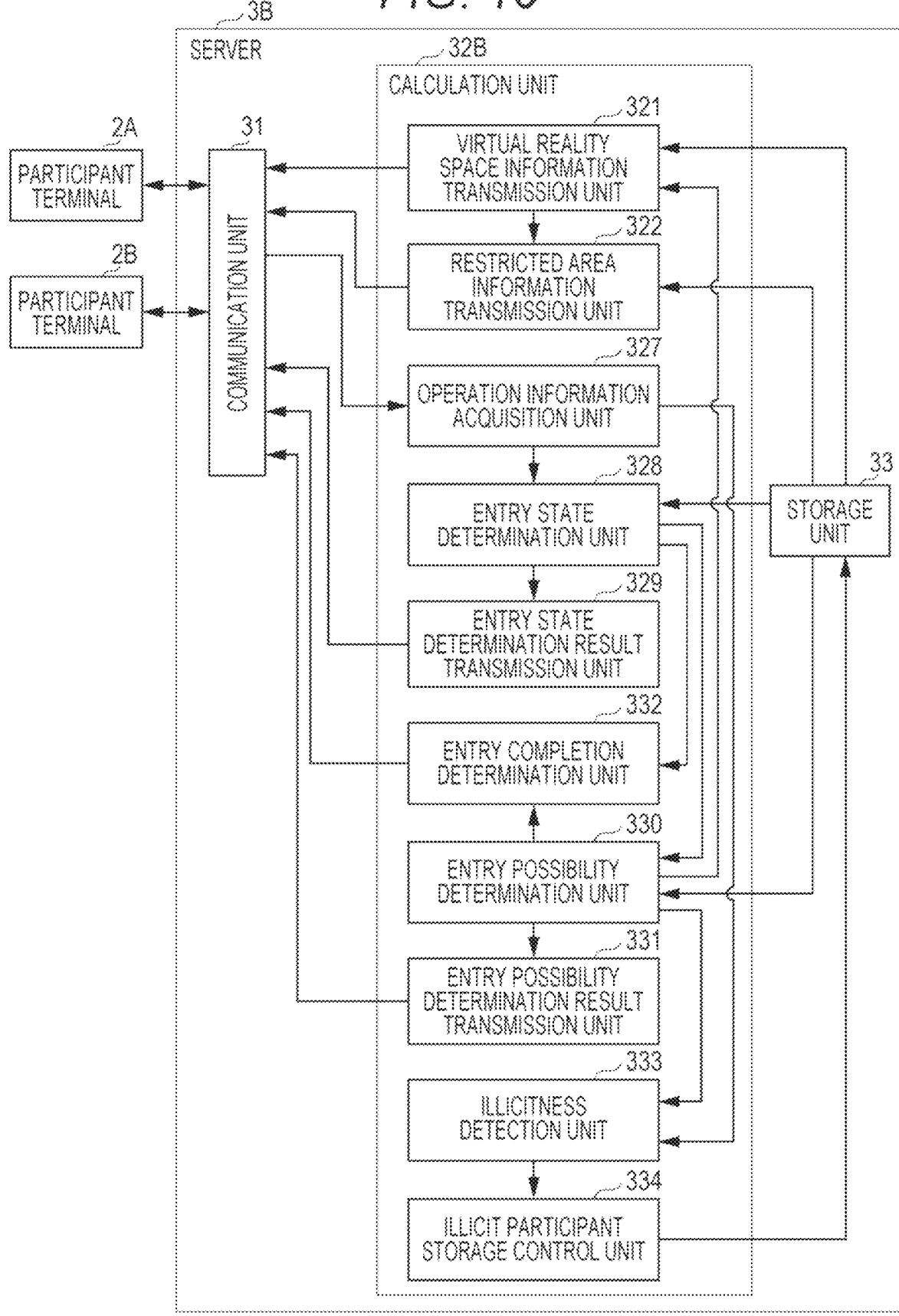
FIG. 10 is a block diagram illustrating a configuration of a second modification of the server according to the first embodiment.

FIG. 10 is a block diagram illustrating a configuration of a server 3B which is a second modification of the server 3. As illustrated in FIG. 10, the server 3B includes the communication unit 31, a calculation unit 32B, and a storage unit 33. The calculation unit 32B includes the virtual reality space information transmission unit 321, the restricted area information transmission unit 322, the operation information acquisition unit 327, the entry state determination unit 328, the entry state determination result transmission unit 329, the entry possibility determination unit 330, the entry possibility determination result transmission unit 331, an entry completion determination unit 332, an illicitness detection unit 333, and an illicit participant storage control unit 334. The calculation unit 32B executes the virtual reality space providing application, thereby implementing respective functions of the virtual reality space information transmission unit 321, the restricted area information transmission unit 322, the operation information acquisition unit 327, the entry state determination unit 328, the entry state determination result transmission unit 329, the entry possibility determination unit 330, the entry possibility determination result transmission unit 331, the entry completion determination unit 332, the illicitness detection unit 333, and the illicit participant storage control unit 334.

The virtual reality space information transmission unit 321 acquires the virtual reality space information from the storage unit 33 and transmits the virtual reality space information to the participant terminals 2A and 2B. The participant terminal 2B is another terminal device having the same configuration as the participant terminal 2A. For example, the storage unit 33 stores virtual reality space information for each virtual reality space. The virtual reality space information transmission unit 321 acquires the virtual reality space information of the virtual reality space designated in the participant terminals 2A and 2B from the storage unit 33, and transmits the virtual reality space information to the participant terminals 2A and 2B via the network 5 using the communication unit 31. Thus, the participant terminals 2A and 2B can acquire the virtual reality space information from the server 3B. Note that, here, it is assumed that the same virtual reality space is designated in the participant terminals 2A and 2B.

The virtual reality space information transmission unit 321 transmits the virtual reality space information excluding the virtual reality space information in the restricted area to the participant terminals 2A and 2B before the avatar participates in the virtual reality space. For example, it is assumed that, after the avatar corresponding to the participant who uses the participant terminal 2A and the avatar corresponding to the participant who uses the participant terminal 2B participate in the virtual reality space, with the both avatars being in a state about to enter the common restricted area, the entry possibility determination unit 330 determines that entry of the both avatars to the restricted area is possible. In this case, the virtual reality space information transmission unit 321 acquires the virtual reality space information in the restricted area from the storage unit 33 and transmits the information to the participant terminals 2A and 2B.

In addition, it is assumed that, after the avatar corresponding to the participant who uses the participant terminal 2A and the avatar corresponding to the participant who uses the participant terminal 2B participate in the virtual reality space, with the both avatars being in a state about to enter the common restricted area, the entry possibility determination unit 330 determines that entry of the avatar corresponding to the participant who uses the participant terminal 2B to the restricted area is possible and determines that entry of the avatar corresponding to the participant who uses the participant terminal 2A to the restricted area is not possible. In this case, the virtual reality space information transmission unit 321 acquires the virtual reality space information in the restricted area from the storage unit 33 and transmits the information to the participant terminal 2B, but does not transmit the information to the participant terminal 2A. Thus, the server 3B can allow only the participant whose entry to the restricted area is determined to be possible to view the virtual reality space information in the restricted area.

The restricted area information transmission unit 322 acquires the restricted area information from the storage unit 33, and transmits the restricted area information to the participant terminals 2A and 2B. For example, the restricted area information transmission unit 322 uses the communication unit 31 to transmit the acquired restricted area information to the participant terminals 2A and 2B via the network 5. Thus, the participant terminals 2A and 2B can acquire the restricted area information from the server 3B.

The operation information acquisition unit 327 acquires the operation information for operating the avatar from the participant terminals 2A and 2B. For example, the operation information acquisition unit 327 uses the communication unit 31 to acquire the operation information from the participant terminals 2A and 2B via the network 5, and outputs the operation information to the entry state determination unit 328. The entry state determination unit 328 determines whether or not the avatar is in a state about to enter the restricted area on the basis of the restricted area information acquired from the storage unit 33 and the operation information acquired by the operation information acquisition unit 327.

The entry state determination result transmission unit 329 uses the communication unit 31 to transmit the entry state determination result determined by the entry state determination unit 328 to the participant terminals 2A and 2B via the network 5. In addition, the entry state determination result transmission unit 329 outputs the entry state determination result determined by the entry state determination unit 328 to the entry possibility determination unit 330.

The entry completion determination unit 332 determines whether or not the avatar whose entry to the restricted area is determined to be not possible has entered the restricted area beyond a state about to enter the restricted area. For example, the entry completion determination unit 332 determines whether or not the avatar coordinates indicated by the operation information have entered the restricted area indicated by the restricted area information, thereby determining whether or not the avatar has entered the restricted area beyond a state about to enter the restricted area.

For example, it is assumed that, after the avatar corresponding to the participant who uses the participant terminal 2A and the avatar corresponding to the participant who uses the participant terminal 2B participate in the virtual reality space, with the both avatars being in a state about to enter the common restricted area it is determined that entry of the avatar corresponding to the participant who uses the participant terminal 2A to the restricted area is not possible, and it is determined that entry of the avatar corresponding to the participant who uses the participant terminal 2B to the restricted area is possible. In a case where it is determined that the both avatars have entered the restricted area, the entry completion determination unit 332 does not transmit information for displaying the avatar corresponding to the participant who uses the participant terminal 2A, which is the avatar whose entry to the restricted area is determined to be not possible, on the other participant terminal 2B. Thus, even in a case where the avatar corresponding to the participant of the participant terminal 2A illicitly enters the restricted area, the server 3B can perform control such that the avatar corresponding to the participant of the participant terminal 2A is not displayed on the display unit 23 of another participant terminal 2B.

The illicitness detection unit 333 detects a state in which the avatar whose entry to the restricted area is determined to be not possible is illicitly viewing the virtual reality space information in the restricted area. For example, the illicitness detection unit 333 specifies the avatar whose entry to the restricted area is determined to be not possible using the entry possibility determination result, and detects whether or not the participant corresponding to the avatar is in a state of illicitly viewing the virtual reality space information in the restricted area on the basis of the operation information regarding the avatar. In a case where the illicitness detection unit 333 detects a state of illicitly viewing, the illicit participant storage control unit 334 causes the information of the participant corresponding to the avatar whose entry to the restricted area is determined to be not possible to be stored in the storage unit 33.

Thus, the server 3B can specify and store the participant who is illicitly viewing the virtual reality space information in the restricted area.

For example, there is also a possibility that the user illicitly modifies the virtual reality space participation application so that correct restricted area viewing control cannot be performed, and the user illicitly views the inside of the restricted area even though it is determined that the entry is not possible on one or both of the participant terminal side and the server side. In this case, even if the server 3B performs the entry possibility determination, temporary illicit viewing cannot be prevented, but as described above, the server 3B can detect a state in which the user who is a participant is performing illicit viewing from the result of the server 3B determining that entry is not possible and the avatar coordinates of the subsequent operation information. On the basis of the detection result, by storing the user who has performed illicit viewing by the server 3B in the storage unit 33, the subsequent use of the service of the virtual reality space by the user can be prohibited or restricted.

Figure 11:
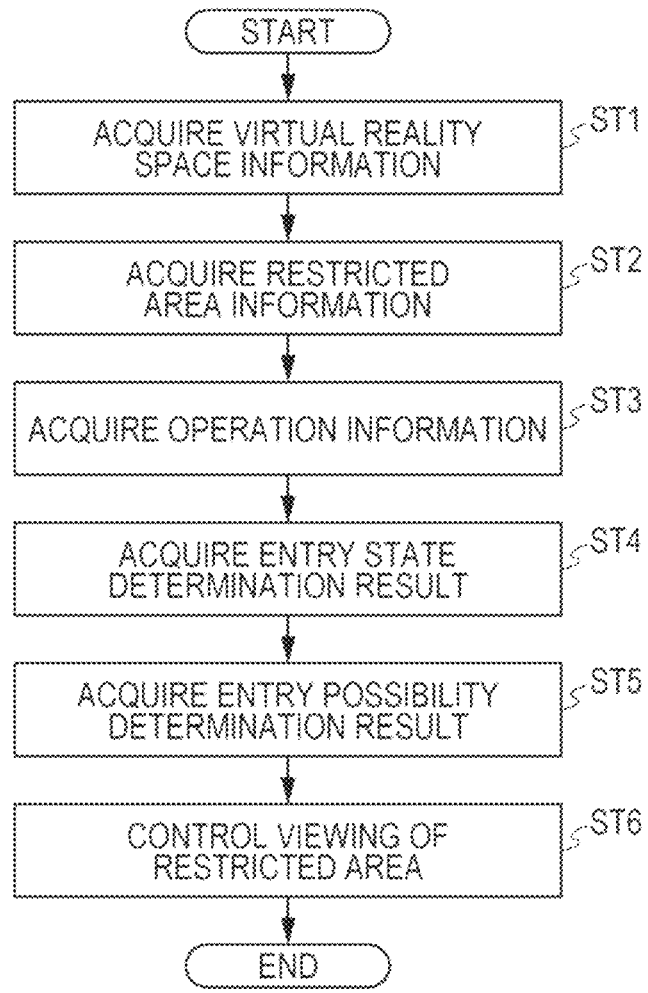
FIG. 11 is a flowchart illustrating a virtual reality space providing method according to the first embodiment.

FIG. 11 is a flowchart illustrating a virtual reality space providing method according to the first embodiment.

The virtual reality space information acquisition unit 221 acquires the virtual reality space information from the server (step ST1). The restricted area information acquisition unit 222 acquires the restricted area information from the server (step ST2). The operation information acquisition unit 223 acquires the operation information for operating the avatar (step ST3). The entry state determination result acquisition unit 225 acquires an entry state determination result that is a result of determining whether or not the avatar is in a state about to enter the restricted area on the basis of the restricted area information and the operation information (step ST4). In a case where the entry state determination result indicates that the avatar is in a state about to enter the restricted area, the entry possibility determination result acquisition unit 228 acquires the entry possibility determination result that is a result of determination regarding whether or not entry of the avatar to the restricted area is possible (step ST5). The restricted area viewing control unit 229 enables viewing of the virtual reality space information in the restricted area in a case where the entry possibility determination result indicates that entry is possible, and disables viewing of the virtual reality space information in the restricted area in a case where the entry possibility determination result indicates that entry is not possible (step ST6). Thus, viewing of the area set in the virtual reality space can be restricted.

Figure 12:
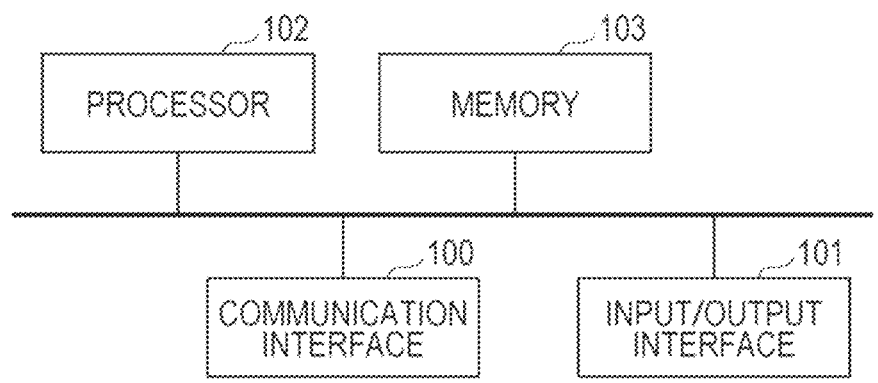
FIG. 12 is a block diagram illustrating a hardware configuration that implements a function of a calculation unit included in the participant terminal or the server according to the first embodiment.

FIG. 12 is a block diagram illustrating a hardware configuration that implements the function of the calculation unit included in the participant terminal 2 or 2A or the server 3, 3A, or 3B. In FIG. 12, the function of the participant terminal 2 or 2A is implemented by the calculation unit 22 or 22A. The calculation unit 22 or 22A includes a communication interface 100, an input/output interface 101, a processor 102, and a memory 103 as hardware configurations. In one or more aspects, the functionality of the elements disclosed herein (e.g., the calculation unit 22, server 3, etc.) may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The respective functions of the virtual reality space information acquisition unit 221, the restricted area information acquisition unit 222, the operation information acquisition unit 223, the entry state determination unit 224, the entry state determination result acquisition unit 225, the condition information acquisition unit 226, the entry possibility determination unit 227, the entry possibility determination result acquisition unit 228, and the restricted area viewing control unit 229 included in the calculation unit 22 are implemented by these hardware configurations. The respective functions of the virtual reality space information acquisition unit 221, the restricted area information acquisition unit 222, the operation information acquisition unit 223, the entry state determination result acquisition unit 225, the entry possibility determination result acquisition unit 228, and the restricted area viewing control unit 229 included in the calculation unit 22A are implemented by these hardware configurations.

The communication interface 100 outputs data received from the server 3, 3A or 3B via the network 5 to the processor 102 by the communication unit 21, and transmits data generated by the processor 102 to the server 3, 3A or 3B via the network 5. The processor 102 controls display on the display unit 23 via the input/output interface 101 and acquires the operation information from the operation unit 24.

An application program for implementing respective functions of the virtual reality space information acquisition unit 221, the restricted area information acquisition unit 222, the operation information acquisition unit 223, the entry state determination unit 224, the entry state determination result acquisition unit 225, the condition information acquisition unit 226, the entry possibility determination unit 227, the entry possibility determination result acquisition unit 228, and the restricted area viewing control unit 229 included in the participant terminal 2 is stored in the storage unit 25. In addition, an application program for implementing respective functions of the virtual reality space information acquisition unit 221, the restricted area information acquisition unit 222, the operation information acquisition unit 223, the entry state determination result acquisition unit 225, the entry possibility determination result acquisition unit 228, and the restricted area viewing control unit 229 included in the participant terminal 2A is stored in the storage unit 25. The storage unit 25 is, for example, a semiconductor memory mounted on a smartphone.

The processor 102 reads the application program stored in the storage unit 25 via the input/output interface 101, loads the application program into the memory 103, and executes the loaded program. Thus, the processor 102 implements respective functions of the participant terminal 2 or 2A. The memory 103 is, for example, a random access memory (RAM).

In addition, the functions of the server 3, 3A, or 3B are implemented by the calculation unit 32, 32A, or 32B. The calculation unit 32, 32A, or 32B includes the communication interface 100, the input/output interface 101, the processor 102, and the memory 103 as hardware configurations as does the calculation unit 22 or 22A.

The respective functions of the virtual reality space information transmission unit 321, the restricted area information transmission unit 322, the condition information transmission unit 323, the restricted area information acquisition unit 324, the authority determination unit 325, and the restricted area information storage control unit 326 included in the calculation unit 32 are implemented by these hardware configurations.

The respective functions of the virtual reality space information transmission unit 321, the restricted area information transmission unit 322, the operation information acquisition unit 327, the entry state determination unit 328, the entry state determination result transmission unit 329, the entry possibility determination unit 330, and the entry possibility determination result transmission unit 331 included in the calculation unit 32A are implemented by these hardware configurations.

The respective functions of the virtual reality space information transmission unit 321, the restricted area information transmission unit 322, the operation information acquisition unit 327, the entry state determination unit 328, the entry state determination result transmission unit 329, the entry possibility determination unit 330, the entry possibility determination result transmission unit 331, the entry completion determination unit 332, the illicitness detection unit 333, and the illicit participant storage control unit 334 included in the calculation unit 32B are implemented by these hardware configurations.

The communication interface 100 outputs data received from the participant terminal 2 or 2A via the network 5 to the processor 102 by the communication unit 31, and transmits data generated by the processor 102 to the participant terminal 2 or 2A via the network 5. The processor 102 controls reading and writing of data from and to the storage unit 33 via the input/output interface 101.

As described above, the participant terminal 2 or 2A according to the first embodiment includes the virtual reality space information acquisition unit 221 that acquires virtual reality space information from the server 3, the restricted area information acquisition unit 222 that acquires restricted area information from the server 3, the operation information acquisition unit 223 that acquires operation information for operating the avatar, the entry state determination result acquisition unit 225 that acquires an entry state determination result of determining whether or not the avatar is in a state about to enter the restricted area, the entry possibility determination result acquisition unit 228 that acquires an entry possibility determination result that is a result of determination regarding whether or not entry of the avatar to the restricted area is possible in a case where the entry state determination result indicates that the avatar is in a state about to enter the restricted area, and the restricted area viewing control unit 229 that enables viewing of the virtual reality space information in the restricted area in a case where the entry possibility determination result indicates that entry is possible, and disables viewing of the virtual reality space information in the restricted area in a case where the entry possibility determination result indicates that entry is not possible. As described above, the participant whose entry to the restricted area partially set in the virtual reality space is determined to be possible is allowed to view the virtual reality space information in the restricted area, and the participant whose entry to the restricted area is determined to be not possible is not allowed to view the virtual reality space information in the restricted area. Thus, the participant terminal 2 or 2A can restrict viewing of a part of the area in the virtual reality space.

The participant terminal 2 according to the first embodiment includes the condition information acquisition unit 226 that acquires condition information from the server 3, and the entry possibility determination unit 227 that determines whether or not the entry is possible on the basis of the condition information. The entry possibility determination result acquisition unit 228 acquires the entry possibility determination result from the entry possibility determination unit 227. Thus, the participant terminal 2 can determine whether or not entry of the avatar to the restricted area is possible.

In the participant terminal 2 or 2A according to the first embodiment, the condition information indicates a condition under which entry of the avatar to the restricted area is possible, and is information indicating at least one of a condition that a participant corresponding to the avatar is a creator who has created the virtual reality space, a condition that the participant is an event-related person related to an event held in the virtual reality space, a condition that the participant is a billed person who is billed for using the virtual reality space, a condition that the participant is a person who has obtained a ticket for using the virtual reality space, or a condition that a time zone in which the avatar is about to enter the restricted area is an available time zone of the restricted area. Thus, whether or not entry of the avatar to the restricted area is possible can be determined on the basis of the condition under which entry of the avatar to the restricted area is possible.

In the participant terminal 2 or 2A according to the first embodiment, the condition information indicates a condition under which entry of the avatar to the restricted area is not possible, and is information indicating at least one of a condition that the participant corresponding to the avatar is a person who has performed an illicit act in the past in the virtual reality space, or a condition that the participant corresponding to the avatar is a person who intends to illicitly enter the restricted area. Thus, whether or not entry of the avatar to the restricted area is possible can be determined on the basis of the condition under which entry of the avatar to the restricted area is not possible.

In the participant terminal 2A according to the first embodiment, the entry possibility determination result acquisition unit 228 acquires the entry possibility determination result from the server 3. Thus, the participant terminal 2A can acquire the entry state determination result that is a result of determining whether or not the avatar is in a state about to enter the restricted area on the basis of the restricted area information and the operation information.

The participant terminal 2 according to the first embodiment includes the entry state determination unit 224 that determines whether or not the avatar is in a state about to enter the restricted area. The entry state determination result acquisition unit 225 acquires the entry state determination result from the entry state determination unit 224. Thus, the participant terminal 2 can determine whether or not the avatar is in a state about to enter the restricted area in the virtual reality space.

In the participant terminal 2 according to the first embodiment, the entry state determination unit 224 determines whether or not the avatar is in a state about to enter the restricted area by determining whether or not coordinates of bones of the avatar or center coordinates of the avatar indicated by the operation information have entered the restricted area indicated by the restricted area information or whether or not the coordinates of the bones or the center coordinates of the avatar have approached the restricted area by a predetermined distance or less. Thus, the entry state determination unit 224 can accurately determine whether or not the avatar is in a state about to enter the restricted area in the virtual reality space.

In the participant terminal 2A according to the first embodiment, the entry state determination result acquisition unit 225 acquires the entry state determination result from the server 3. Thus, the participant terminal 2A can acquire an entry possibility determination result that is a result of determination regarding whether or not entry of the avatar to the restricted area is possible.

In the participant terminal 2 or 2A according to the first embodiment, the restricted area viewing control unit 229 disables viewing of the virtual reality space information in the restricted area by pushing the avatar out of the restricted area, replacing the virtual reality space information in the restricted area with other virtual reality space information, masking a part of the virtual reality space information in the restricted area, blurring the restricted area, or transferring the avatar about to enter the restricted area to an area other than the restricted area. Thus, the participant terminal 2 or 2A can control the viewing of the virtual reality space information in the restricted area on the basis of the entry possibility determination result.

In the participant terminal 2 or 2A according to the first embodiment, the virtual reality space information acquisition unit 221 acquires the virtual reality space information excluding the virtual reality space information in the restricted area from the server 3 before the avatar participates in the virtual reality space. After the avatar participates in the virtual reality space, the restricted area viewing control unit 229 enables viewing of the virtual reality space information in the restricted area by acquiring the virtual reality space information in the restricted area in a case where the entry possibility determination result indicates that entry is possible, and disables viewing of the virtual reality space information in the restricted area by not acquiring the virtual reality space information in the restricted area from the server in a case where the entry possibility determination result indicates that entry is not possible. Thus, the participant terminal 2 or 2A can control the viewing of the virtual reality space information in the restricted area on the basis of the entry possibility determination result.

The server 3, 3A, or 3B according to the first embodiment includes the virtual reality space information transmission unit 321 that acquires the virtual reality space information from the storage unit 33 and transmits the virtual reality space information to the participant terminal 2 or 2A, and the restricted area information transmission unit 322 that acquires the restricted area information from the storage unit 33 and transmits the restricted area information to the participant terminal 2 or 2A. Thus, the participant terminal 2 or 2A can acquire the virtual reality space information and the restricted area information from the server 3, 3A, or 3B.

The server 3 according to the first embodiment includes the condition information transmission unit 323 that acquires condition information indicating a condition for determining whether or not entry of the avatar to the restricted area is possible from the storage unit 33 and transmits the condition information to the participant terminal 2. Thus, the participant terminal 2 can acquire the condition information from the server 3.

The server 3A or 3B according to the first embodiment includes the entry possibility determination unit 330 that acquires condition information from the storage unit 33 and determines whether or not entry of the avatar to the restricted area is possible on the basis of the condition information, and the entry possibility determination result transmission unit 331 that transmits an entry possibility determination result, which is a determination result by the entry possibility determination unit 330, to the participant terminal 2A. Thus, the participant terminal 2A can acquire the entry possibility determination result.

The server 3A according to the first embodiment includes the operation information acquisition unit 327 that acquires operation information for operating the avatar from the participant terminal 2A, the entry state determination unit 328 that determines whether or not the avatar is in a state about to enter the restricted area on the basis of the restricted area information and the operation information, and the entry state determination result transmission unit 329 that transmits an entry state determination result, which is a determination result by the entry state determination unit 328, to the participant terminal 2A. Thus, the participant terminal 2A can acquire the entry state determination result.

The server 3B according to the first embodiment includes the entry completion determination unit 332 that determines whether or not the avatar whose entry to the restricted area is determined to be not possible has entered the restricted area beyond the state about to enter the restricted area. In a case where it is determined that the avatar corresponding to the participant of the participant terminal 2A whose entry to the restricted area is determined to be not possible has entered the restricted area, information for displaying the avatar whose entry to the restricted area is determined to be not possible is not transmitted to another participant terminal 2B different from the participant terminal 2A. Thus, the server 3B can perform control not to display the avatar corresponding to the participant of the participant terminal 2A on the display unit 23 of the another participant terminal 2B even if the avatar corresponding to the participant of the participant terminal 2A illicitly enters the restricted area.

In the server 3B according to the first embodiment, the virtual reality space information transmission unit 321 transmits the virtual reality space information excluding the virtual reality space information in the restricted area to the participant terminal 2A before the avatar participates in the virtual reality space. After the avatar participates in the virtual reality space, in a state where the avatar is about to enter the restricted area, the virtual reality space information transmission unit 321 transmits the virtual reality space information in the restricted area to the participant terminal 2A in a case where entry of the participant of the participant terminal 2A to the restricted area is determined to be possible, and does not transmit the virtual reality space information in the restricted area to the participant terminal 2A in a case where entry of the participant of the participant terminal 2A to the restricted area is determined to be not possible. Thus, the server 3B can allow only the participant whose entry to the restricted area is determined to be possible to view the virtual reality space information in the restricted area.

The server 3B according to the first embodiment includes the illicitness detection unit 333 that detects a state in which the avatar whose entry to the restricted area is determined to be not possible is illicitly viewing the virtual reality space information in the restricted area, and the illicit participant storage control unit 334 that causes information of a participant corresponding to the avatar whose entry to the restricted area is determined to be not possible to be stored in the storage unit 33 in a case where the state of illicit viewing is detected. Thus, the server 3B can specify and store the participant who is illicitly viewing the virtual reality space information in the restricted area.

The server 3 according to the first embodiment includes the restricted area information acquisition unit 324 that acquires restricted area information from the management terminal 4, and the restricted area information storage control unit 326 that causes the restricted area information acquired from the management terminal 4 to be stored in the storage unit 33 in association with the virtual reality space information of the virtual reality space. Thus, the server 3 can receive the setting of the restricted area information from the management terminal 4.

The server 3 according to the first embodiment includes the authority determination unit 325 that determines whether or not the restricted area information acquired from the management terminal 4 has been transmitted from a setter having a restricted area setting authority. In a case where the restricted area information acquired from the management terminal 4 is transmitted from the setter having the restricted area setting authority, the restricted area information storage control unit 326 causes the restricted area information acquired from the management terminal 4 to be stored in the storage unit 33. Thus, the server 3 can receive the setting of the restricted area information by an appropriate setter.

The virtual reality space providing system 1 according to the first embodiment includes at least the participant terminal 2 or 2A and the server 3. Thus, the virtual reality space providing system 1 can restrict viewing of a part of the area in the virtual reality space.

By causing a computer to execute the virtual reality space participation application according to the first embodiment, the computer can be caused to function as the participant terminal 2 or 2A. Thus, the participant terminal 2 or 2A can be implemented.

By causing a computer to execute the virtual reality space providing application according to the first embodiment, the computer can be caused to function as the server 3, 3A, or 3B. Thus, the server 3, 3A, or 3B can be implemented.

A virtual reality space providing method according to the first embodiment includes acquiring, by the virtual reality space information acquisition unit 221, virtual reality space information from a server 3, acquiring, by the restricted area information acquisition unit 222, restricted area information from the server 3, acquiring, by the operation information acquisition unit 223, operation information for operating the avatar, acquiring, by the entry state determination result acquisition unit 225, an entry state determination result that is a result of determining whether or not the avatar is in a state about to enter the restricted area on the basis of the restricted area information and the operation information, acquiring, by the entry possibility determination result acquisition unit 228, an entry possibility determination result that is a result of determination regarding whether or not entry of the avatar to the restricted area is possible in a case where the entry state determination result indicates that the avatar is in a state about to enter the restricted area, and by the restricted area viewing control unit 229, enabling viewing of the virtual reality space information in the restricted area in a case where the entry possibility determination result indicates that entry is possible, and disabling viewing of the virtual reality space information in the restricted area in a case where the entry possibility determination result indicates that entry is not possible. Thus, viewing of a part of the area in the virtual reality space can be restricted.

Note that any component of the embodiment can be modified or any component of the embodiment can be omitted.

What is claimed is:

1. A terminal device, comprising:
    circuitry configured to
    acquire virtual reality space information, which is three-dimensional data of a virtual reality space, from a server;
    acquire, from the server, restricted area information that is information different from the virtual reality space information and is three-dimensional data of a restricted area that is a space area partially set as an arbitrary three-dimensional shape in the virtual reality space and to which entry of an avatar that participates in the virtual reality space is restricted, wherein the restricted area information includes a shape and a position of the restricted area, wherein the shape and the position are freely set by a user that creates the restricted area;
    acquire operation information for operating the avatar;
    acquire condition information indicating a condition for determining whether or not the entry is possible from the server;
    determine whether or not the entry is possible based on the condition information;
    acquire an entry state determination result that is a result of determining whether or not the avatar is within a predetermined distance of entering the restricted area based on the restricted area information and the operation information;
    acquire an entry possibility determination result that is a result of determination whether or not entry of the avatar to the restricted area is possible in a case where the entry state determination result indicates that the avatar is within a predetermined distance of entering the restricted area; and
    enable viewing of the virtual reality space information in the restricted area in a case where the entry possibility determination result indicates that entry is possible, and disable viewing of the virtual reality space information in the restricted area in a case where the entry possibility determination result indicates that entry is not possible by pushing the avatar away from the restricted area, wherein pushing the avatar away from the restricted area includes setting avatar coordinates to such that the avatar moves in a second direction away from the restricted area even in a case that the operation information indicates the operation of further moving the avatar in a first direction toward the restricted area, wherein the first direction and the second direction are different.

2. The terminal device according to claim 1, wherein the condition information indicates a condition under which entry of the avatar to the restricted area is possible, and is information indicating at least one of a condition that a participant corresponding to the avatar is a creator who has created the virtual reality space, a condition that the participant is an event-related person related to an event held in the virtual reality space, a condition that the participant is a billed person who is billed for using the virtual reality space, or a condition that a time zone in which the avatar is about to enter the restricted area is an available time zone of the restricted area.

3. The terminal device according to claim 1, wherein the condition information indicates a condition under which entry of the avatar to the restricted area is not possible, and is information indicating at least one of a condition that the participant corresponding to the avatar is a person who has performed an illicit act in a past in the virtual reality space, or a condition that the participant corresponding to the avatar is a person who intends to illicitly enter the restricted area.

4. The terminal device according to claim 1, wherein the circuitry is further configured to
    acquire the entry possibility determination result from the server.

5. The terminal device according to claim 1, wherein the circuitry is further configured to
    determine whether or not the avatar is within a predetermined distance of entering the restricted area based on the restricted area information and the operation information.

6. The terminal device according to claim 5, wherein the circuitry is further configured to
    determine whether or not the avatar is within a predetermined distance of entering the restricted area by determining whether or not coordinates of bones of the avatar or center coordinates of the avatar indicated by the operation information have entered the restricted area indicated by the restricted area information or whether or not the coordinates of the bones or the center coordinates of the avatar have approached the restricted area by a predetermined distance or less.

7. The terminal device according to claim 1, wherein the circuitry is further configured to
    acquire the entry state determination result from the server.

8. The terminal device according to claim 1, wherein the circuitry is further configured to
    replacing the virtual reality space information in the restricted area with other virtual reality space information, masking a part of the virtual reality space information in the restricted area, blurring the restricted area, or transferring the avatar about to enter the restricted area to an area other than the restricted area.

9. The terminal device according to claim 1, wherein the circuitry is further configured to
    acquire the virtual reality space information excluding the virtual reality space information in the restricted area from the server before the avatar participates in the virtual reality space, and
    after the avatar participates in the virtual reality space, enable viewing of the virtual reality space information in the restricted area by acquiring the virtual reality space information in the restricted area in a case where the entry possibility determination result indicates that entry is possible, and disables viewing of the virtual reality space information in the restricted area by not acquiring the virtual reality space information in the restricted area from the server in a case where the entry possibility determination result indicates that entry is not possible.

10. The terminal device according to claim 1, wherein the restricted area information includes an orientation of the restricted area.

11. A server, comprising:
    circuitry configured to
    acquire virtual reality space information, which is three-dimensional data of a virtual reality space, from a memory and transmit the virtual reality space information to a terminal device;

acquire, from the memory, restricted area information that is information different from the virtual reality space information and is three-dimensional data of a restricted area that is a space area partially set as an arbitrary three-dimensional shape in the virtual reality space and to which entry of an avatar that participates in the virtual reality space is restricted, and transmit the restricted area information to the terminal device, wherein the restricted area information includes a shape and a position of the restricted area, wherein the shape and the position are freely set by a user that creates the restricted area;

acquire condition information indicating a condition for determining whether or not entry of the avatar to the restricted area is possible from the memory and transmit the condition information to the terminal device; and in a case that the avatar is within a predetermined distance of the restricted area and it is determined that entry of the avatar to the restricted area is not possible, receive avatar coordinates such that the avatar is transferred to an area different than a position of the avatar prior to being transferred and outside of the restricted area.

12. The server according to claim 11, wherein the circuitry is further configured to determine whether or not the avatar whose entry to the restricted area is determined to be not possible has entered the restricted area beyond area predetermined amount by illicitly modifying a virtual reality space participation application so that correct determination of the entry possibility by a participant terminal cannot be performed, and wherein in a case where it is determined that the avatar whose entry to the restricted area is determined to be not possible has entered the restricted area, information for displaying the avatar whose entry to the restricted area is determined to be not possible on another terminal device different from the terminal device is not transmitted to the another terminal device.

13. The server according to claim 11, wherein the circuitry is further configured to transmit the virtual reality space information excluding the virtual reality space information in the restricted area to the terminal device before the avatar participates in the virtual reality space, and after the avatar participates in the virtual reality space, in a state where the avatar is within a predetermined distance of entering the restricted area, transmit the virtual reality space information in the restricted area to the terminal device in a case where entry of the avatar to the restricted area is determined to be possible, and not transmit the virtual reality space information in the restricted area to the terminal device in a case where entry of the avatar to the restricted area is determined to be not possible.

14. The server according to claim 11, wherein the circuitry is further configured to detect a state in which the avatar whose entry to the restricted area is determined to be not possible is illicitly viewing the virtual reality space information in the restricted area by illicitly modifying a virtual reality space participation application so that correct determination of the entry possibility by a participant terminal cannot be performed; and cause information of a participant corresponding to the avatar whose entry to the restricted area is determined to be not possible to be stored in the memory in a case where the state of illicit viewing is detected.

15. The server according to claim 11, wherein the circuitry is further configured to acquire the restricted area information from a restricted area setting terminal device that sets the restricted area in the virtual reality space;

cause the restricted area information acquired from the restricted area setting terminal device to be stored in the memory in association with the virtual reality space information of the virtual reality space;

determine whether or not the restricted area information acquired from the restricted area setting terminal device has been transmitted from a setter having restricted area setting authority; and in a case where the restricted area information acquired from the restricted area setting terminal device is transmitted from the setter having the restricted area setting authority, cause the restricted area information acquired from the restricted area setting terminal device to be stored in the memory.

16. The server according to claim 12, wherein the circuitry is further configured to acquire condition information indicating a condition for determining whether or not entry of the avatar to the restricted area is possible from the memory, and determine whether or not entry of the avatar to the restricted area is possible based on the condition information; and transmit an entry possibility determination result, which is a determination result by the server-side, to the terminal device.

17. The server according to claim 11, wherein the circuitry is further configured to acquire operation information for operating the avatar from the terminal device;

determine whether or not the avatar is within a predetermined distance of entering the restricted area based on the restricted area information and the operation information; and transmit an entry state determination result, which is a determination result by the server-side, to the terminal device.

18. The server according to claim 11, wherein the circuitry is further configured to acquire the restricted area information from a restricted area setting terminal device that sets the restricted area in the virtual reality space; and cause the restricted area information acquired from the restricted area setting terminal device to be stored in the memory in association with the virtual reality space information of the virtual reality space.

19. A virtual reality space providing system, comprising:
a server; and
a terminal device, the terminal device including circuitry configured to acquire virtual reality space information, which is three-dimensional data of a virtual reality space, from the server;

acquire, from the server, restricted area information that is information different from the virtual reality space information and is three-dimensional data of a restricted area that is a space area partially set as an arbitrary three-dimensional shape in the virtual reality space and to which entry of an avatar that participates in the virtual reality space is restricted, wherein the restricted area information includes a shape and a position of the restricted area, wherein the shape and the position are freely set by a user that creates the restricted area;

acquire operation information for operating the avatar;

acquire condition information indicating a condition for determining whether or not the entry is possible from the server;

determine whether or not the entry is possible based on the condition information; acquire an entry state determination result that is a result of determining whether or not the avatar is within a predetermined distance of entering the restricted area based on the restricted area information and the operation information;

acquire an entry possibility determination result that is a result of determination whether or not entry of the avatar to the restricted area is possible in a case where the entry state determination result indicates that the avatar is within a predetermined distance of entering the restricted area; and enable viewing of the virtual reality space information in the restricted area in a case where the entry possibility determination result indicates that entry is possible, and disable viewing of the virtual reality space information in the restricted area in a case where the entry possibility determination result indicates that entry is not possible by pushing the avatar away from the restricted area, wherein pushing the avatar away from the restricted area includes setting avatar coordinates to such that the avatar moves in a second direction away from the restricted area even in a case that the operation information indicates the operation of further moving the avatar in a first direction toward the restricted area, wherein the first direction and the second direction are different.

20. A non-transitory computer-readable storage medium storing computer-readable instructions thereon which, when executed by a computer, causes the computer to perform a method, the method comprising:

acquiring virtual reality space information, which is three-dimensional data of a virtual reality space, from a server;

acquiring, from the server, restricted area information that is information different from the virtual reality space information and is three-dimensional data of a restricted area that is a space area partially set as an arbitrary three-dimensional shape in the virtual reality space and to which entry of an avatar that participates in the virtual reality space is restricted, wherein the restricted area information includes a shape and a position of the restricted area, wherein the shape and the position are freely set by a user that creates the restricted area;

acquiring operation information for operating the avatar;

acquiring condition information indicating a condition for determining whether or not the entry is possible from the server;

determining whether or not the entry is possible based on the condition information;

acquiring an entry state determination result that is a result of determining whether or not the avatar is within a predetermined distance of entering the restricted area based on the restricted area information and the operation information;

acquiring an entry possibility determination result that is a result of determination whether or not entry of the avatar to the restricted area is possible in a case where the entry state determination result indicates that the avatar is within a predetermined distance of entering the restricted area; and enabling viewing of the virtual reality space information in the restricted area in a case where the entry possibility determination result indicates that entry is possible, and disabling viewing of the virtual reality space information in the restricted area in a case where the entry possibility determination result indicates that entry is not possible by pushing the avatar away from the restricted area, wherein pushing the avatar away from the restricted area includes setting avatar coordinates to such that the avatar moves in a second direction away from the restricted area even in a case that the operation information indicates the operation of further moving the avatar in a first direction toward the restricted area, wherein the first direction and the second direction are different.

21. A non-transitory computer-readable storage medium storing computer-readable instructions thereon which, when executed by a computer, causes the computer to perform a method, the method comprising:

acquiring virtual reality space information, which is three-dimensional data of a virtual reality space, from a memory and transmitting the virtual reality space information to a terminal device;

acquire, from the memory, restricted area information that is information different from the virtual reality space information and is three-dimensional data of a restricted area that is a space area partially set as an arbitrary three-dimensional shape in the virtual reality space and to which entry of an avatar that participates in the virtual reality space is restricted, and transmitting the restricted area information to the terminal device, wherein the restricted area information includes a shape and a position of the restricted area, wherein the shape and the position are freely set by a user that creates the restricted area;

acquiring condition information indicating a condition for determining whether or not entry of the avatar to the restricted area is possible from the memory and transmitting the condition information to the terminal device, wherein at least one of the condition is that the participant is a person who has obtained a ticket for using the virtual reality space; and in a case that the avatar is within a predetermined distance of the restricted area and it is determined that entry of the avatar to the restricted area is not possible, receive avatar coordinates such that the avatar is transferred to an area different than a position of the avatar prior to being transferred and outside of the restricted area.

22. A virtual reality space providing method, comprising:

acquiring virtual reality space information, which is three-dimensional data of a virtual reality space, from a server;

acquiring, from the server, restricted area information that is information different from the virtual reality space information and is three-dimensional data of a restricted area that is a space area partially set as an arbitrary three-dimensional shape in the virtual reality space and to which entry of an avatar that participates in the virtual reality space is restricted, wherein the restricted area information includes a shape and a position of the restricted area, wherein the shape and the position are freely set by a user that creates the restricted area;

acquiring operation information for operating the avatar;

acquiring condition information indicating a condition for determining whether or not the entry is possible from the server;

determining whether or not the entry is possible based on the condition information;

acquiring an entry state determination result that is a result of determining whether or not the avatar is within a predetermined distance of entering the restricted area based on the restricted area information and the operation information;

acquiring an entry possibility determination result that is a result of determination whether or not entry of the avatar to the restricted area is possible in a case where the entry state determination result indicates that the avatar is within a predetermined distance of entering the restricted area; and enabling viewing of the virtual reality space information in the restricted area in a case where the entry possibility determination result indicates that entry is possible, and disabling viewing of the virtual reality space information in the restricted area in a case where the entry possibility determination result indicates that entry is not possible by pushing the avatar away from the restricted area, wherein pushing the avatar away from the restricted area includes setting avatar coordinates to such that the avatar moves in a second direction away from the restricted area even in a case that the operation information indicates the operation of further moving the avatar in a first direction toward the restricted area, wherein the first direction and the second direction are different.

* * * * *